(12) United States Patent
Shaheen et al.

(10) Patent No.: US 10,912,110 B2
(45) Date of Patent: Feb. 2, 2021

(54) SYSTEMS AND METHODS FOR AN ENHANCED SCHEDULING REQUEST FOR 5G NR

(71) Applicants: Sharp Kabushiki Kaisha, Sakai (JP); FG Innovation Company Limited, Hong Kong (CN)

(72) Inventors: Kamel M. Shaheen, Camas, WA (US); Tatsushi Aiba, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/928,926

(22) Filed: Mar. 22, 2018

(65) Prior Publication Data

US 2018/0279353 A1 Sep. 27, 2018

Related U.S. Application Data

(63) Continuation of application No. PCT/US2018/023556, filed on Mar. 21, 2018.

(60) Provisional application No. 62/476,309, filed on Mar. 24, 2017.

(51) Int. Cl.
*H04W 72/12* (2009.01)
*H04W 72/04* (2009.01)
*H04W 84/04* (2009.01)

(52) U.S. Cl.
CPC ..... *H04W 72/1289* (2013.01); *H04W 72/042* (2013.01); *H04W 72/1284* (2013.01); *H04W 84/042* (2013.01)

(58) Field of Classification Search
None
See application file for complete search history.

(56) References Cited

U.S. PATENT DOCUMENTS

| 10,524,105 | B2* | 12/2019 | Lee | H04W 72/14 |
|---|---|---|---|---|
| 2016/0301515 | A1* | 10/2016 | Ouchi | H04L 5/0057 |
| 2016/0381681 | A1 | 12/2016 | Nogami et al. | |
| 2017/0257876 | A1* | 9/2017 | Loehr | H04W 28/0263 |
| 2017/0290042 | A1* | 10/2017 | Islam | H04W 72/1252 |
| 2017/0310431 | A1* | 10/2017 | Iyer | H04L 1/1816 |
| 2017/0366311 | A1* | 12/2017 | Iyer | H04B 7/0482 |
| 2018/0049227 | A1* | 2/2018 | Moon | H04W 72/0446 |

(Continued)

FOREIGN PATENT DOCUMENTS

WO 2016010227 A1 1/2016

OTHER PUBLICATIONS

Ericsson, "E-mail discussion report [97#62]", 3GPP TSG-RAN WG2 #97bis, Spokane, USA, R1-1702667, Apr. 7, 2017.

(Continued)

*Primary Examiner* — Kodzovi Acolatse
(74) *Attorney, Agent, or Firm* — Austin Rapp

(57) ABSTRACT

A 5G new radio (NR) Base Station (gNB) is described. The gNB includes a processor and memory in electronic communication with the processor. Instructions stored in the memory are executable to send a radio resource control (RRC) message to a user equipment (UE). The RRC message(s) includes different physical uplink control channel (PUCCH) configuration options and/or SR-configurations, comprising one or more of the following information elements (IE), i.e., Bandwidth, Numerology, BWP, Logical Channel (LCH), priority, LCG, Service, etc., for the UE to use in transmitting one or more scheduling requests (SR).

4 Claims, 21 Drawing Sheets

(56) References Cited

U.S. PATENT DOCUMENTS

| | | | |
|---|---|---|---|
| 2018/0063869 A1* | 3/2018 | Zhang | H04W 74/0833 |
| 2018/0124815 A1* | 5/2018 | Papasakellariou | H04L 5/0053 |
| 2018/0270698 A1* | 9/2018 | Babaei | H04W 72/042 |
| 2018/0270699 A1* | 9/2018 | Babaei | H04W 28/0278 |
| 2018/0270700 A1* | 9/2018 | Babaei | H04W 28/0278 |
| 2018/0279229 A1* | 9/2018 | Dinan | H04W 52/146 |
| 2018/0279353 A1* | 9/2018 | Shaheen | H04W 72/1284 |
| 2018/0368173 A1* | 12/2018 | Shaheen | H04W 72/1289 |
| 2019/0230685 A1* | 7/2019 | Park | H04L 5/00 |
| 2019/0260530 A1* | 8/2019 | Yi | H04L 5/001 |
| 2019/0327728 A1* | 10/2019 | Zhang | H04B 7/0617 |
| 2019/0357204 A1* | 11/2019 | Matsumura | H04W 72/0413 |
| 2019/0380153 A1* | 12/2019 | Damnjanovic | H04W 74/0833 |

OTHER PUBLICATIONS

Ericsson, "Uplink dynamic scheduling in NR", 3GPP TSG RAN WG2 #97, Athens, Greece, R1-1700838, Feb. 17, 2017.

Intel Corporation, "Enhancements of SR/BSR in NR", 3GPP TSG RAN WG2 Meeting #97, Athens, Greece, R2-1701723, Feb. 17, 2017.

Huawei, HiSilicon, "UL Scheduling Enhancement in NR", 3GPP TSG-RAN WG2 #97, Athens, Greece, R2-1701207, Feb. 17, 2017.

3GPP TS 36.300 V13.4.0, Evolved Universal Terrestrial Radio Access (E-UTRA) and Evolved Universal Terrestrial Radio Access Network (E-UTRAN); Overall description; Stage 2, (Release 13) Jun. 2016.

3GPP TS 36.331, V14.1.0, Evolved Universal Terrestrial Radio Access (E-UTRA); Radio Resource Control (RRC); Protocol specification (Release 14) Dec. 2016.

3GPP TS 36.304, V14.0.0, Evolved Universal Terrestrial Radio Access (E-UTRA); User Equipment (UE) procedures in idle mode (Release 14) Sep. 2016.

International Search Report and Written Opinion issued for PCT Application No. PCT/US2018/023556 dated Jun. 6, 2018.

* cited by examiner

SYSTEMS AND METHODS FOR AN ENHANCED SCHEDULING REQUEST FOR 5G NR

RELATED APPLICATIONS

This application is related to and claims priority from U.S. Provisional Patent Application No. 62/476,309, entitled "SYSTEMS AND METHODS FOR AN ENHANCED SCHEDULING REQUEST FOR 5G NR," filed on Mar. 24, 2017, which is hereby incorporated by reference herein, in its entirety.

TECHNICAL FIELD

The present disclosure relates generally to communication systems. More specifically, the present disclosure relates to systems and methods for an enhanced scheduling request for 5G NR.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
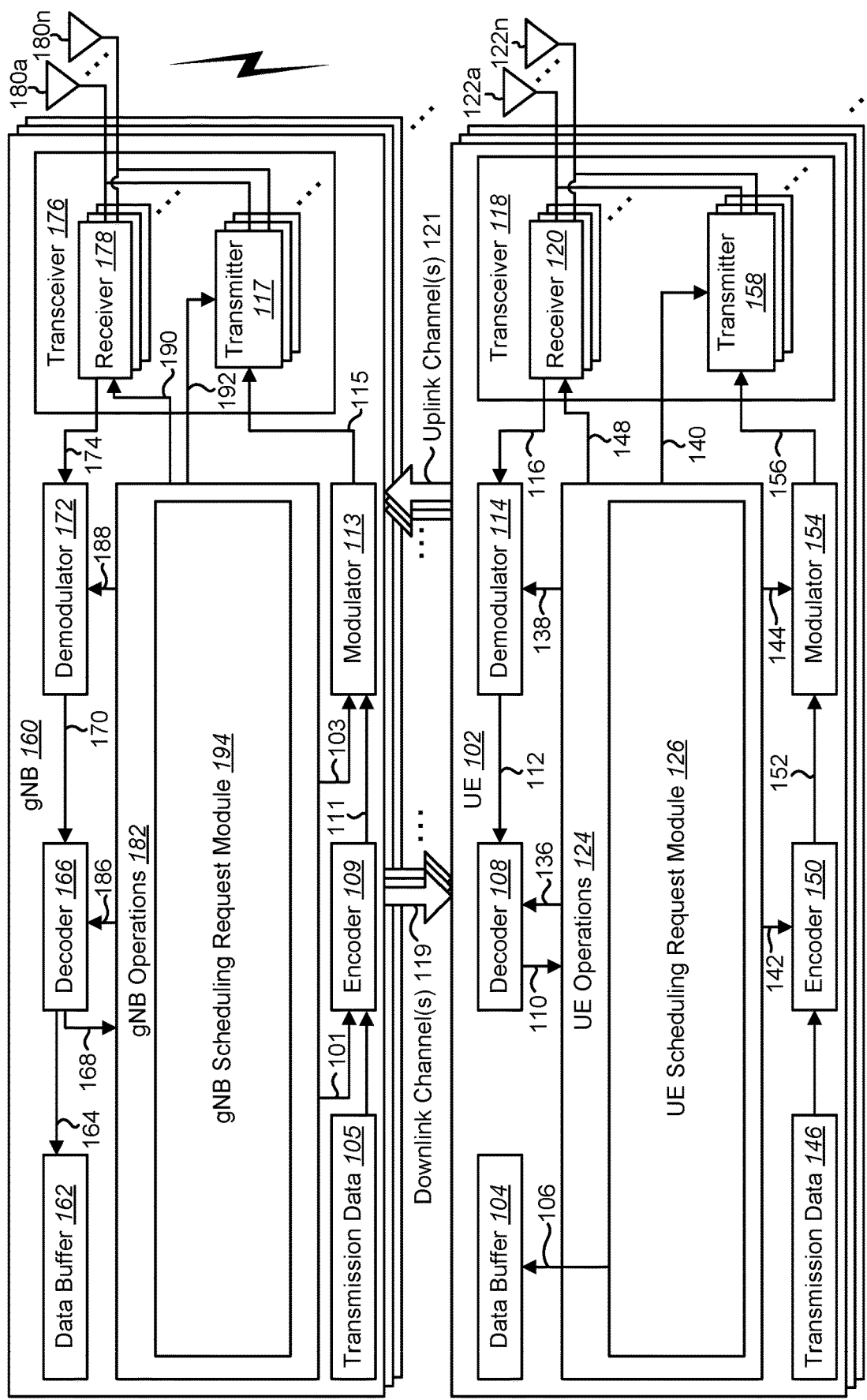
FIG. 1 is a block diagram illustrating one implementation of one or more gNBs and one or more UEs in which systems and methods for an enhanced scheduling request (SR) may be implemented.

A user equipment (UE) is described. The UE includes receiving circuitry configured to receive, from a base station apparatus (gNB), a radio resource control (RRC) message(s) that includes one or more physical uplink control channel (PUCCH) configurations indicating one or more PUCCH resources. Each PUCCH resource is corresponding to one or more bandwidth part (BWP) and one or more logical channel.

The UE may also include transmitting circuitry configured to transmit, to the base station apparatus, a scheduling request(s) based on any one or more of the following: one or more SR configurations, one or more PUCCH configuration(s), and/or one or more BWP configuration(s).

The UE may also include receiving circuitry configured to receive, from the base station apparatus, a radio resource control (RRC) message(s) that includes bandwidth part (BWP) identifier(s) indicating one or more BWPs. The BWP configuration may be used for indicating uplink frequency location, uplink BW size, and numerology.

The UE may also include transmitting circuitry configured to transmit, to the base station apparatus, a scheduling request on the one or more BWPs indicated by the BWP identifier(s). The UE may also include transmitting circuitry configured to transmit, to the base station apparatus, a scheduling request(s) on the one or more BWPs based on the BWP configuration.

A base station apparatus (gNB) may include transmitting circuitry configured to transmit, to a user equipment (UE), a radio resource control (RRC) message(s) comprising one or more physical uplink control channel (PUCCH) configurations indicating one or more PUCCH resources. Each PUCCH resource is corresponding to one or more bandwidth part (BWP) and one or more logical channel.

The gNB may also include receiving circuitry configured to receive, from the user equipment, a scheduling request(s) based on any one or more of the following: one or more SR configurations, one or more PUCCH configuration(s), and/or one or more BWP configuration(s).

The gNB may include transmitting circuitry configured to transmit, to a user equipment, a radio resource control (RRC) message(s) comprising bandwidth part (BWP) identifier(s) indicating one or more BWPs. The BWP configuration may be used for indicating uplink frequency location, uplink BW size, and numerology.

The gNB may also include receiving circuitry is configured to receive, from the user equipment, a scheduling request(s) on the one or more BWPs indicated by the BWP identifier(s). The gNB may also include receiving circuitry configured to receive, from the user equipment, a scheduling request on the one or more BWPs based on the BWP configuration.

A communication method of a user equipment is also described. The method includes receiving, from a base station apparatus, a radio resource control (RRC) message(s) comprising one or more physical uplink control channel (PUCCH) configurations indicating one or more PUCCH resources. Each PUCCH resource is corresponding to one or more bandwidth part (BWP) and one or more logical channel.

A communication method of a base station apparatus is also described. The method includes transmitting, to a user equipment, a radio resource control (RRC) message(s) comprising bandwidth part (BWP) identifier(s) indicating one or more BWPs, and one or more BWP configuration for each BWP identifier.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a gNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NR" by 3GPP) envisions the use of time/frequency/space resources to allow for enhanced mobile broadband (eMBB) communication and ultra-reliable low latency communication (URLLC) services, as well as massive machine type communication (mMTC) like services. In order for the services to use the time/frequency/space medium efficiently it would be useful to be able to flexibly schedule services on the medium so that the medium may be used as effectively as possible, given the conflicting needs of URLLC, eMBB, and mMTC. An NR base station may be referred to as a gNB. A gNB may also be more generally referred to as a base station device.

The systems and methods described herein provide multiple mechanisms to enhance the operation of the Scheduling Request (SR) mechanism for a 5G NR UE and gNB. Time and frequency division multiplexing mechanisms may be used to enable gNB Radio Resource Management (RRM) scheduler to determine the SR priority in order to sort the uplink (UL) transmission grant and/or resources. In this mechanism, an LTE SR mechanism may be used at the UE where one bit is used to indicate whether the UE is in need of a transmission grant. The 5G NR UE with enhanced SR may determine the right time and/or frequency to send the SR on a Physical Uplink Control Channel (PUCCH) where each time and/or frequency indicates a specific traffic characteristic and/or service and/or logical channel group.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for an enhanced scheduling request (SR) may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)), and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel), and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling request module 126.

The function of the SR is for the UE 102 to indicate that it needs an uplink grant because it has data to transmit but no uplink grant. The SR may be a single bit indication triggered in the medium access control (MAC) and transmitted on PUCCH. The UE 102 may be configured with an SR configuration to transmit the SR. If the UE 102 has no UL resources allocated to it in which it could send an SR, the UE 102 may in turn send the SR using a random access procedure.

Here SR may be corresponding to traffic characteristics, logical channel, logical channel group, the amount of data available, information related to numerology and/or Transmission Time Interval (TTI) duration, and/or the priority of data.

The periodicity of the SR periodicity can be {1, 2, 5, 10, 20, 40, 80} ms. After the transmission of the SR, the UE 102 may monitor the PDCCH and upon reception of an UL grant, the UL-SCH transmission may follow 4 subframes later. The SR periodicity is a main contributor to the overall latency from data arrival to the UL-SCH transmission, unless it is kept very short. There is a trade-off between SR periodicities and the capacity. With a short SR periodicity in the system, fewer UEs 102 can be configured with SR compared to longer SR periodicities, which allows more UEs 102 to be configured with SR.

Short latency in NR may be important to support services like URLLC. This may impact the design of the SR. The design of the SR in a multi-numerology/TTI duration configuration also influences the latency. With regard to NR, some considerations for SR latency and periodicity include: major design changes related to SR latency and periodicity compared to LTE; what is the impact from the NR latency requirements; what is the impact from a multiple numerology/TTI duration configuration; and what is the impact from other functions designed to reduce latency (e.g., grant-free transmissions and SPS).

The function of the Buffer Status Report (BSR) in LTE is for the UE 102 to report the amount of available data in the UE 102 to the eNB. The eNB can then use this information to set the size of the UL grant. Logical channels are grouped together in logical channel groups (LCGs). A BSR is triggered if data becomes available in an LCG and all other LCGs have no data, or if data belonging to a logical channel with a higher priority than all other LCGs becomes available, or if there is room in the MAC Protocol Data Unit (PDU) to send a BSR instead of padding. There may be two timers which upon expiry trigger BSR. A BSR contains information on the amount of data available per logical channel group. The BSR is carried as a MAC control element (CE) in a MAC PDU.

Like the SR, the design of the BSR for NR may be impacted by the multi-numerology/TTI duration configuration supported in NR. The systems and methods described herein provide mechanisms for BSR for NR.

Uplink scheduling is a key functionality to meet a broad range of use cases including enhanced mobile broadband, massive MTC, critical MTC, and additional requirements. In LTE, scheduling requests (SRs) are used for requesting UL-SCH resources for new transmissions when the UE 102 has no valid grant. If SRs are not configured for the UE 102, the UE 102 may initiate a Random Access procedure to get scheduled in UL.

Here, SRs include only one bit of information and indicate only that the UE 102 needs an UL grant. And, upon the reception of SR, the gNB 160 knows neither which logical channel (associated with certain Quality of Service (QoS) Class Identifier (QCI)) has data available for transmission, or the amount of data available for transmission at the UE 102. Furthermore, it should be noted that the numerology/TTI duration should be conveyed in the grant. This implies that the gNB 160 may also be made aware of what numerology/TTI duration is desired by the UE 102 for the upcoming transmission. In short, in NR an accurate grant cannot be provided to the UE 102 only based on the one-bit information of the LTE type of SR. It should be noted that LTE scheduling request saves physical layer resources but does not provide sufficient information for efficient grant allocation in NR.

Buffer Status Reports (BSRs) on the other hand carry more detailed information compared to SR. A BSR indicates buffer size for each LCG. However, the BSR requires a grant for transmission so it may take a longer time until the gNB 160 receives it since it may need to be preceded by an SR. The interaction between SR, BSR and grant is exemplified in FIG. 2.

The framework with SR/BSR from LTE may be improved. In an approach, the SR/BSR scheme from LTE can be reused in NR as a baseline. NR should support a wide spread of use cases which have different requirements. In some use cases (e.g., critical MTC and URLLC), NR has tighter latency requirements than has been considered for LTE so far. Also, services such as eMBB can enjoy the enhancements to SR and BSR.

In NR, modifications of SR/BSR aim to report the UE buffer status (e.g., priority and the buffer size) as well as wanted numerology/TTI duration within the given time constraints. It is assumed that a mapping of logical channel (LCH) to LCG to numerology/TTI duration will make it possible to infer which numerology/TTI duration to use given the LCG. Hence no explicit signaling of numerology/TTI duration is needed in the SR/BSR if an LCG (or LCH) is present in the SR/BSR. Considering the limitations identified above, it is possible to either enhance SR with more information bits to indicate more information or enhance BSR.

A possible improvement is to extend the SR to not only indicate whether data is available or not. With more bits used in SR it would be possible to provide more detailed information such as the type of LCG that has data available, and/or the amount of available data associated with the LCG. By knowing the type of LCG, a gNB 160 can provide grants for the traffic that needs to be scheduled. This enables a more correct priority handling. By indicating the amount of available data associated with the LCG that needs a grant at the UE 102, the gNB 160 can provide a more suitable grant size on the preferred numerology/TTI duration, for instance, to the UE 102.

Since the numerology/TTI duration can be derived from the LCG, situations where the UE 102 has data for transmission on, for example, a short TTI, but receives a grant on a long TTI can be avoided. How many bits that SR should be extended with is a question of how to achieve a good trade-off between the increased L1 control channel issues (e.g., overhead, design complexity, etc.) and the achieved gain in terms of UP latency reduction. Therefore, more efficient priority handling may be achieved by extending additional bits for SR.

The BSR may also be enhanced. With regard to grant-free transmission for BSR, to avoid the delay caused by BSR grant allocation, grant-free transmission of BSR without sending an SR may be supported. This may be a viable opportunity at low and medium load and in cells serving relatively few (active) UEs 102.

Similar grant-free mechanisms are also expected to be introduced that may delay critical use cases such as URLLC. For fast BSR reporting purposes, a dedicated resource allocation per UE 102 may be used. If grant-free transmissions are supported, it would be efficient to send BSR per logical channel group (also referred to as short BSR in LTE). In this way, only the BSR intended for high priority of traffic can be allowed to use the grant-free channel. For efficiency reasons, the grant-free resources assigned per UE 102 may be large enough to fit just the BSR. The grant-free resources should also be possible to be utilized by data transfer, if there is no BSR pending for transmission. Therefore, grant allocation delay for BSR can be reduced with grant-free transmission of BSRs.

Improved BSR triggering is also described. In LTE, some of the existing rules for BSR triggering may be too strict. For instance, the UE 102 may be allowed to transmit a BSR when there is new data available in the buffer with higher priority than the existing data, while the UE 102 is not allowed to send a BSR if the new data has the same or lower priority than the existing data. This may lead to information mismatch between the UE 102 and gNB 160, resulting in a long unnecessary scheduling delay until the UE 102 can empty its transmission buffer. In this case, a simple solution is to remove the above restriction (i.e., let the UE 102 send the BSR when there is new data regardless of its priority). The network can configure this feature considering the balance between increased BSR reporting overhead and the need for accurate buffer information estimation. Therefore, the scheduling delay may be reduced by allowing a UE 102 to send BSR upon the arrival of new data regardless of the priority of its associated logical channel.

Just as in the case of SR, the gNB 160 needs to be made aware of what numerology/TTI duration that is preferred or what data is wanted. Since it may be assumed that a mapping of LCH to LCG to numerology/TTI duration will make it possible to infer which numerology/TTI duration to use given the LCG indicated in the BSR, no additional information is needed in the BSR.

SR enhancements give fast reporting without grant allocation at Layer 2. However, it would incur a higher control channel overhead, and higher design complexity. It is also more difficult to ensure the transmission reliability given that more information bits are carried. BSR enhancements potentially achieve the same performance as SR enhancements in terms of reduction of UP latency. While it requires network to assign dedicated resources to each UE 102, it might have a risk of resource over-provision in a case where there are a massive amount of connected UEs 102.

In some cases, if SR enhancements are adopted, BSR enhancements may not be needed and vice versa. Therefore, it is meaningful to further compare different enhancements.

In order to utilize the SCH resources efficiently, a scheduling function is used in MAC. An overview of the scheduler is given in terms of scheduler operation, signaling of scheduler decisions, and measurements to support scheduler operation. The MAC in an NR gNB 160 may include dynamic resource schedulers that allocate physical layer resources for the DL-SCH, UL-SCH transport channels. Different schedulers operate for the DL-SCH and the UL-SCH.

The scheduler should take account of the traffic volume and the QoS requirements of each UE 102 and associated radio bearers when sharing resources between UEs 102. Only "per UE" grants may be used to grant the right to transmit on the UL-SCH. Since a logical channel can be mapped to one or more numerologies/TTI durations, the grant may be limited to certain logical channels mapped with certain numerologies, so, only those logical channels are allowed to transmit upon reception of this grant. Schedulers may assign resources taking into account the radio conditions at the UE 102 identified through measurements made at the gNB 160 and/or reported by the UE 102.

In the uplink, an NR gNB 160 may dynamically allocate resources (e.g., Physical Resource Blocks (PRBs) and MCS) to UEs 102 at each TTI via the Cell Radio Network Temporary Identifier (C-RNTI) on PDCCH(s). Within each scheduling epoch, the scheduling entity may assign a grant associated with a set of numerologies/TTI durations for each schedulable UE 102.

Measurement reports are required to enable the scheduler to operate in both uplink and downlink. These include transport volume and measurements of a UE's radio environment. Uplink buffer status reports (BSR) and scheduling request (SR) are needed to provide support for QoS-aware packet scheduling.

The scheduling request (SR) as a layer one signaling message may be used for requesting UL resources for new transmissions when the UE 102 has no valid grant. An SR can be transmitted via either a PUCCH like channel in a case where the UE 102 has dedicated resources assigned for it, or a Random Access procedure in a case where the UE 102 has no dedicated resources assigned for it or the UE 102 is out of synchronization from the network.

Uplink buffer status reports (BSR) refer to the data that is buffered in for a group of logical channel (LCG) in the UE 102. Uplink buffer status reports are transmitted using MAC signaling. Prior to a BSR transmission, the UE 102 is required to have a valid grant. The scheduling entity needs to be aware information including: an indication that a UE 102 has data to transmit; buffer size for each logical channel (group); priority indication for each logical channel (group); and/or an indication of a set of the associated numerologies/TTI durations for each logical channel (group). For each UE 102, the above information may be reported by a SR or a BSR.

As described above, in LTE, UL scheduling is mainly based on the scheduling request (SR) and buffer status report (BSR) received from UEs 102. The SR is an indication to the eNB to provide a UL grant for transmitting the BSR and contains no information of the amount of data. The information of the amount of data for each of the logical channel group (LCG) may be provided in the BSR.

In NR, UL scheduling based on SR/BSR can be used for eMBB. For URLLC, other than the grant-less transmission, UL scheduling based on SR/BSR may also be implemented. In LTE, when a scheduling request (SR) is triggered, the UE 102 indicates to the eNB that it has data to transmit in the buffer. The eNB provides a default UL grant which is used by the UE 102 to transmit the data and/or BSR. It may be the case that the provided grant is enough to transmit all data. However, it is also likely that the grant is not enough and the UE 102 has to request another grant using BSR. The consequence of this process is additional delay for the case when the UE 102 would have been able to transmit all data, had the first UL grant been little bit larger. Also, there is no indication of the priority of the SR. Allowing the gNB 160 to know the priority of the SR would help the gNB 160 scheduler prioritize the UL resources among the UEs 102.

In LTE, the eNB has no information whether the UE 102 has a large or small amount of data and also whether the UE 102 has high priority data until the eNB receives a BSR. For delay-sensitive use cases, it can be beneficial if the SR is enhanced to piggyback more information about the characteristic of data being queued at the UE buffer. It is because the UE 102 may be able to transmit all the data in the first UL grant it receives without waiting for the next UL grant received based on a BSR.

NR has to support variety of services. Other than eMBB services, NR also supports URLLC services which require ultra-low latency. Even within eMBB services, there are services that are more delay-stringent than others and may have a higher priority. There may also be Radio Resource Control (RRC)/Non-Access Stratum (NAS) signaling requiring higher priority than normal data transmission from other UEs 102. Hence, it may be beneficial for the gNB scheduler to know the priority of the SR to allow the gNB 160 to prioritize the UL resources among the UEs 102.

In order for the eNB scheduler to schedule the UL resources directly from the received SR, it needs to know the characteristics of the UL data which is contained in the LCG. Hence, it is beneficial for the gNB scheduler to know the LCG associated with UL data. SR with more information on traffic characteristic/services may be beneficial for better UL scheduling at the network. However, in today's LTE SR format, no extra information bits are present apart from presence or absence of SR.

In LTE, there are two types of BSR formats that can be reported to the eNB. The first one is the short/truncated BSR format where buffer status of one logical channel group can be reported. The second one is the long BSR format where data from all logical channel groups are reported. In LTE, there are four LCGs. In NR, more LCGs may be defined to provide finer granularity of the data priorities depending on the number of logical channels or types of services to be supported.

A drawback of the current method is that it is not flexible to transmit the BSR corresponding to two to (max-1) LCGs. It is also not possible to identify the TTIs or service for which the BSR is being reported. Such identification may be helpful for better UL scheduling decision by the network.

In LTE sidelink operation, each sidelink logical channel group is defined per ProSe destination. A ProSe destination with the highest priority is selected for UL scheduling by the network. Therefore, the sidelink BSR format is different than that of LTE legacy BSR format.

In NR, it is also possible that more logical channel groups than that of LTE are defined for BSR to help the network better prioritize the user's data. This requires a change in MAC CE format of the BSR, which can be done efficiently if it is defined in terms of logical channel or logical channel groups.

In LTE, only four logical channel group (LCG) are defined to prioritize the data. In NR, for finer granularity of data priorities to reflect the various services and numerologies a UE is supporting, a larger number of LCGs could be necessary in NR. In this case, a new MAC CE for BSR needs to be designed to accommodate all data corresponding to a number of LCGs. The MAC CE could include one or more than one LCG IDs of the data.

Another option in enhancing the BSR could be reporting the BSR corresponding to each logical channel. In NR, it is likely that a logical channel may be associated with a TTI or a service in a UE 102. It could be possible that data in one logical channel may be more important or have higher priority than the data in other logical channel. This can be decided based on a mapping function between the logical channel and TTI duration or QoS flow profile. For this purpose, a new MAC CE can be defined to indicate the logical channel associated with the buffer index in the BSR.

There will be a variety of use cases which have quite different QoS requirements. UL scheduling is a key functionality in MAC layer. However, the legacy LTE scheduling procedure of SR-UL grant-BSR-UL grant-Data is too complex to support the wide spread of use cases, especially for some latency-tolerant services.

As described in connection with FIG. 2, the scheduling request (SR) is used to request a UL grant for BSR when the UE 102 has a new transmission. In LTE, SR consists of only one bit of information, which makes it lack of the ability to provide accurate information of UE's buffer. Compared to SR, Buffer Status Reports (BSR) can carry more bits to provide more detailed information but at the expense of additional delay. SR and BSR have their own advantages and disadvantages.

The potential directions could include SR enhancements and BSR enhancements. In view of the wide spread of use cases in NR, some cases need enhancements while some cases may not need enhancements. So the enhancements should be flexible enough to be configured by gNB 160. Therefore, the network may configure or restrict the usage of the SR/BSR enhancements for certain cases (e.g., services/radio condition/NW resource, etc.).

SR enhancements can be described in different categories. One category is to use more bits in SR, which would be possible to provide more detailed information as BSR does. The additional bits may include the type of LCG that has data available, and/or the amount of available data associated with the LCG. By this way, the gNB 160 may obtain more information of UE's buffer status from enhanced SR in order to provide a suitable UL grant. Another category is to introduce a shorter period time for URLLC to support fast scheduling.

In LTE, the existing rules for BSR triggering are too strict. For example, a "Regular BSR" may be triggered when either the data belongs to a logical channel with higher priority than the priorities of the logical channels which belong to any LCG and for which data is already available for transmission, or there is no data available for transmission for any of the logical channels which belong to a LCG. While the UE 102 is not allowed to trigger a BSR if the new data has the same or lower priority than the existing data. This may lead a buffer information mismatch between the UE 102 and eNB 160. Some enhancements may be considered to accelerate the BSR triggering to alleviate the mismatch.

In legacy LTE, BSR MAC control elements consist of either: a short BSR and truncated BSR format (e.g., one LCG ID field and one corresponding Buffer Size field); or a long BSR format (e.g., four Buffer Size fields, corresponding to LCG IDs).

Once receiving BSR, eNB can only acquire the information about the amount of data available for transmission per LCG in the UL buffers. However, it cannot further identify the specific information of each logical channel associated with the LCG. At a glance that new characteristic in terms of numerology are introduced in NR. BSR per UE with additional information of numerology/LCH may be considered to indicate high priority BSR.

Furthermore, the gNB 160 may make an exact resources allocation if the UE 102 can report BSR with a precise value. Therefore, BSR may indicate accurate buffer size information. Thus, the gNB 160 may assign an accurate UL grant accordingly for the purpose of decreasing the following probability of segmentation or resource waste.

As seen by this discussion, enhancements to the scheduling request for NR may be beneficial. The systems and methods described herein provide multiple mechanisms to enhance the operation of the scheduling request (SR) mechanism, for a 5G NR UE 102 and gNB 160.

Figure 4:
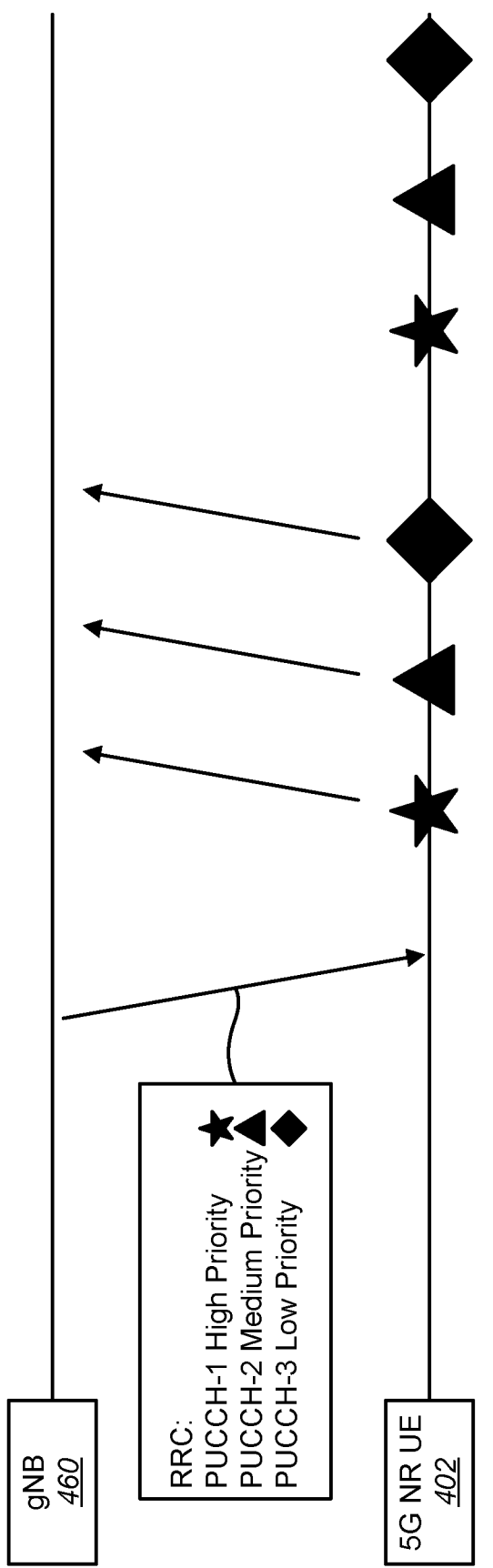
FIG. 4 is an example illustrating an SR transmission using a time division multiplexing (TDM)-based priority indication.
Figure 5:
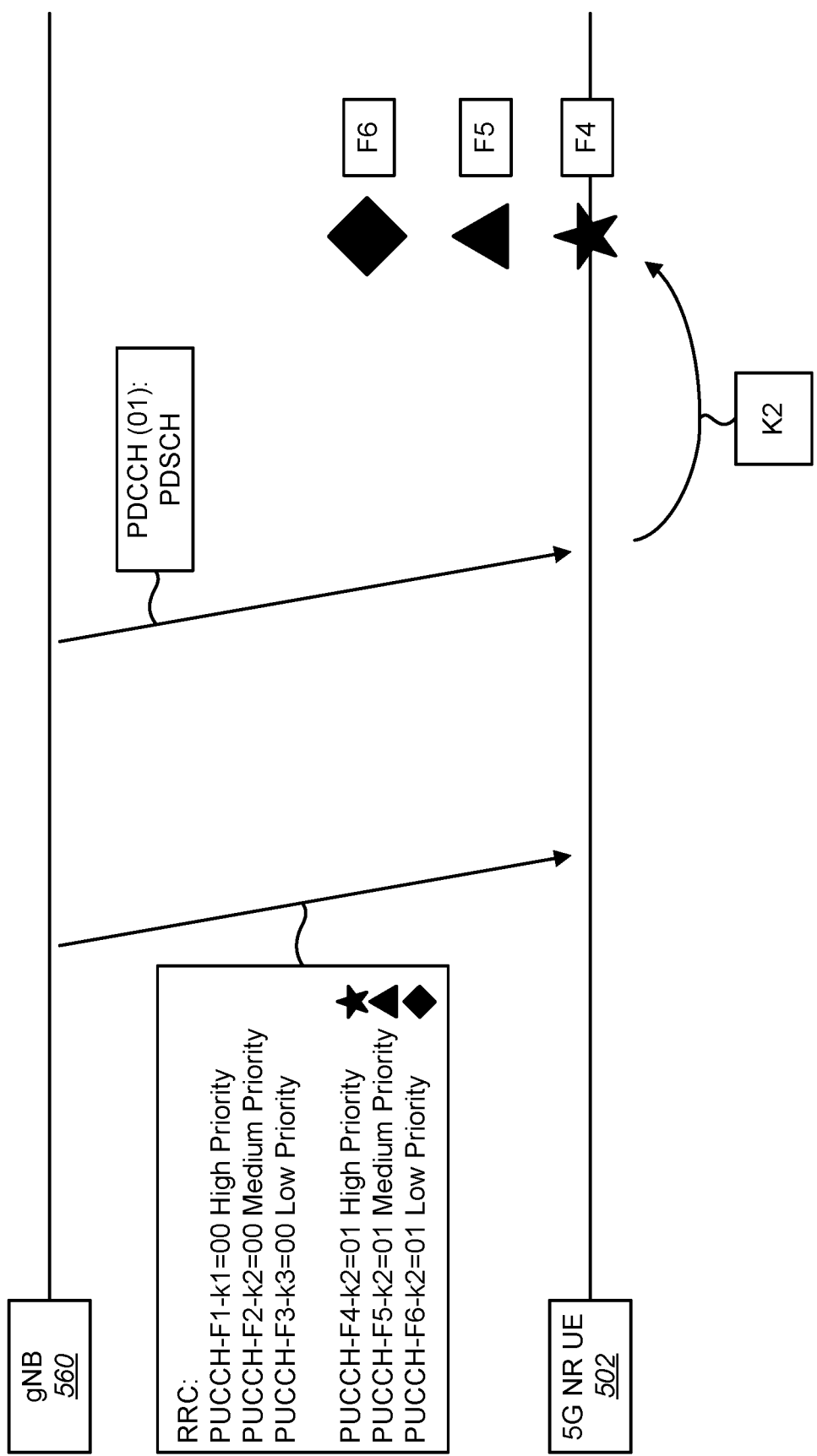
FIG. 5 is an example illustrating an SR transmission using a frequency division multiplexing (FDM)-based priority indication.
Figure 6A:
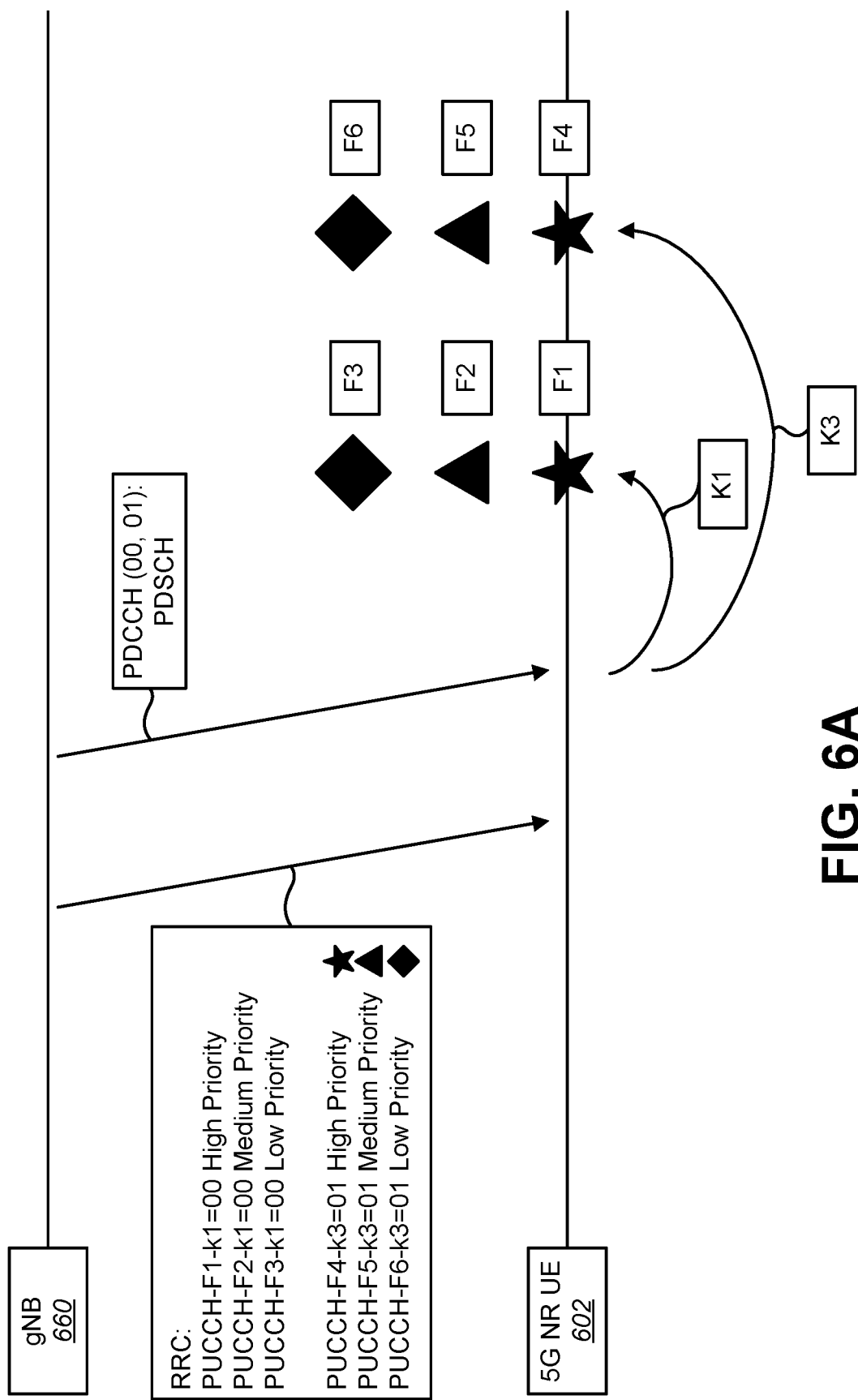
FIG. 6A is an example illustrating an SR transmission using a FDM and TDM-based priority indication.

Time and frequency division multiplexing mechanisms are used to enable a gNB RRM scheduler to determine the SR priority in order to sort the UL transmission grant/resources. In this mechanism, the same LTE SR mechanism may be used at the UE 102 where one bit is used to indicate whether the UE 102 is in need of a transmission grant. The 5G NR UE 102 with enhanced SR may determine the right time and/or frequency to send the SR on PUCCH where each time and/or frequency indicates a specific traffic characteristic and/or service and/or logical channel group. FIG. 4 is an example illustrating an SR transmission using a time division multiplexing (TDM)-based priority indication. FIG. 5 is an example illustrating an SR transmission using a frequency division multiplexing (FDM)-based priority indication. FIG. 6A is an example illustrating an SR transmission using a FDM and TDM-based priority indication.

Figure 7:
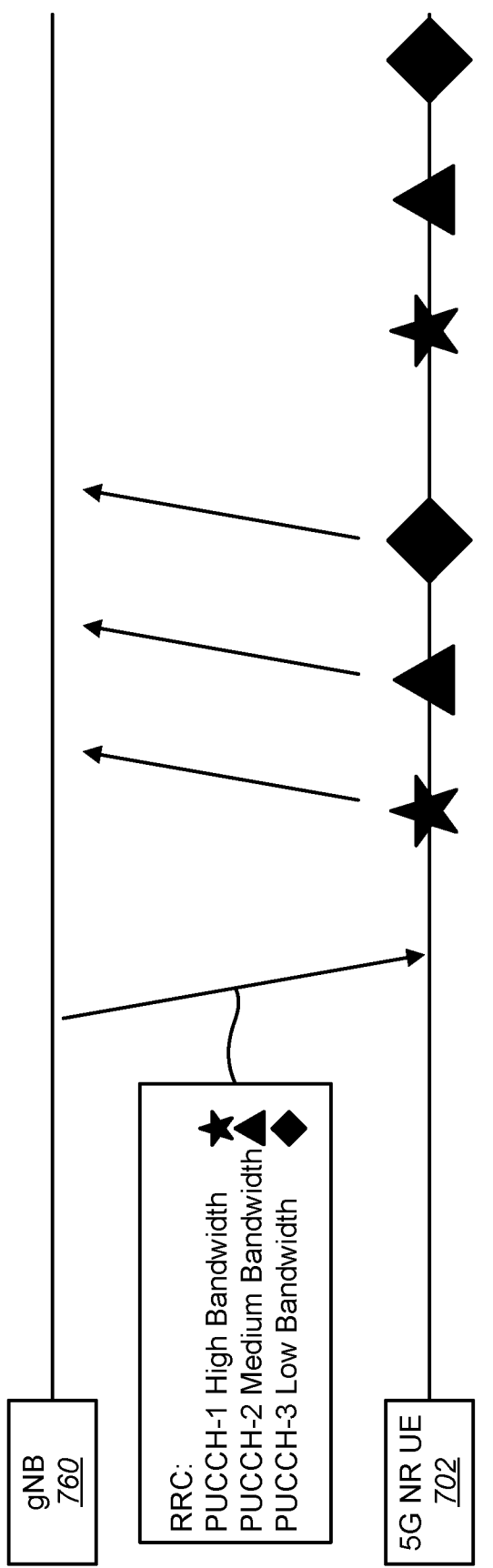
FIG. 7 is an example illustrating an SR transmission using a TDM-based priority indication for different bandwidths.
Figure 8:
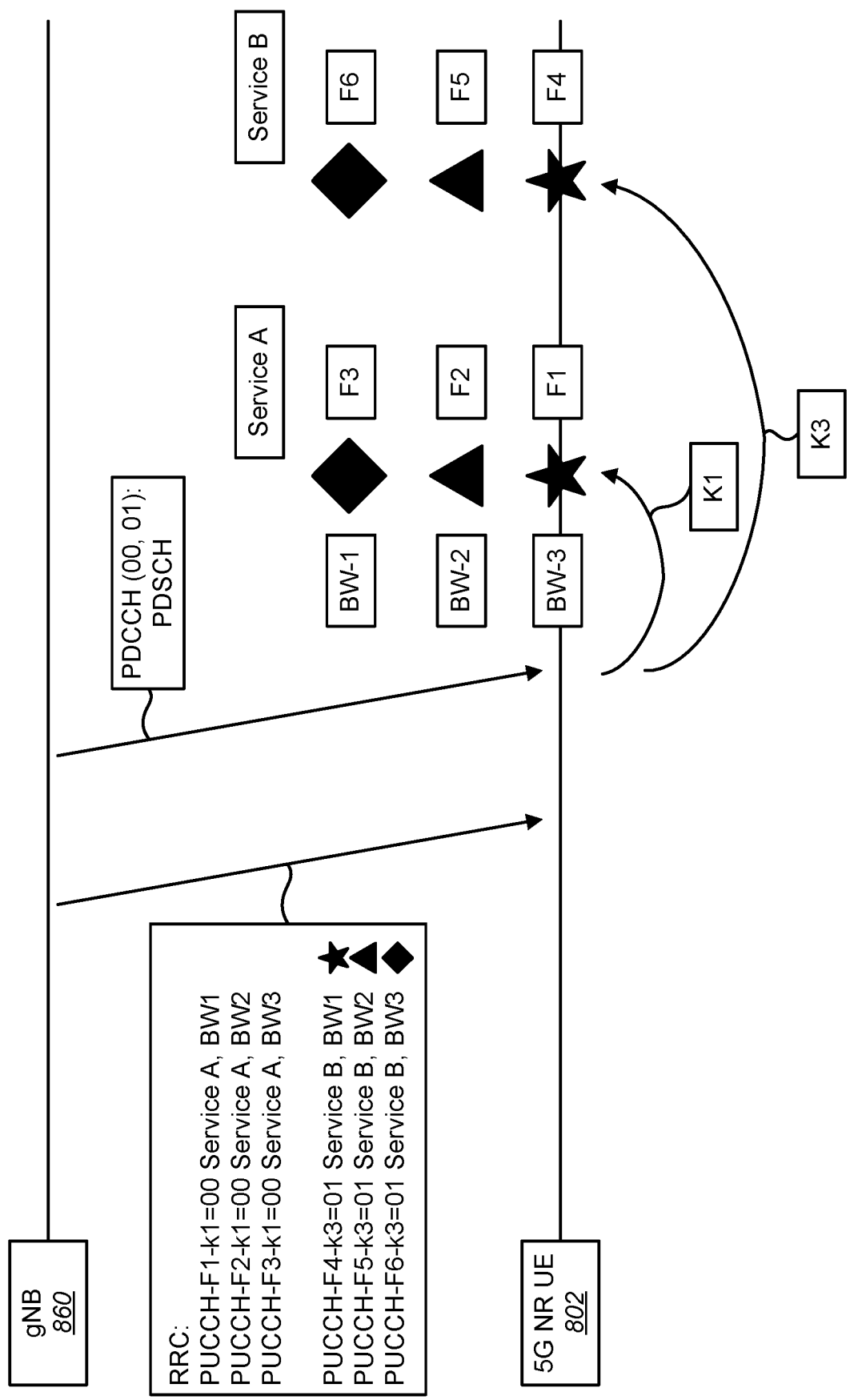
FIG. 8 is an example illustrating an SR transmission using a FDM and TDM-based priority indication for different bandwidths and services.
Figure 9:
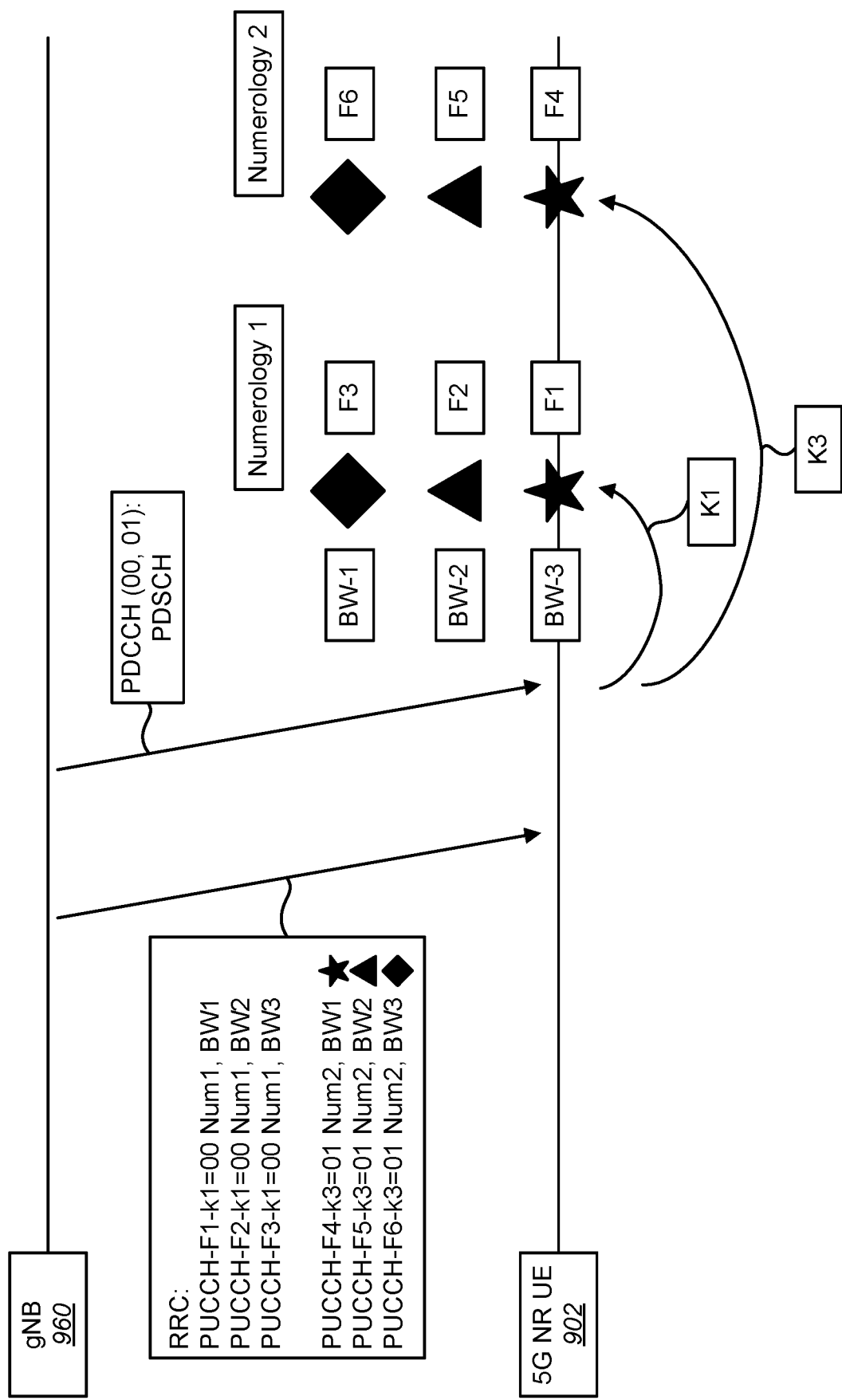
FIG. 9 is an example illustrating an SR transmission using a FDM and TDM-based priority indication for different bandwidths and numerologies (e.g., Bandwidth Part BWP)
Figure 10:
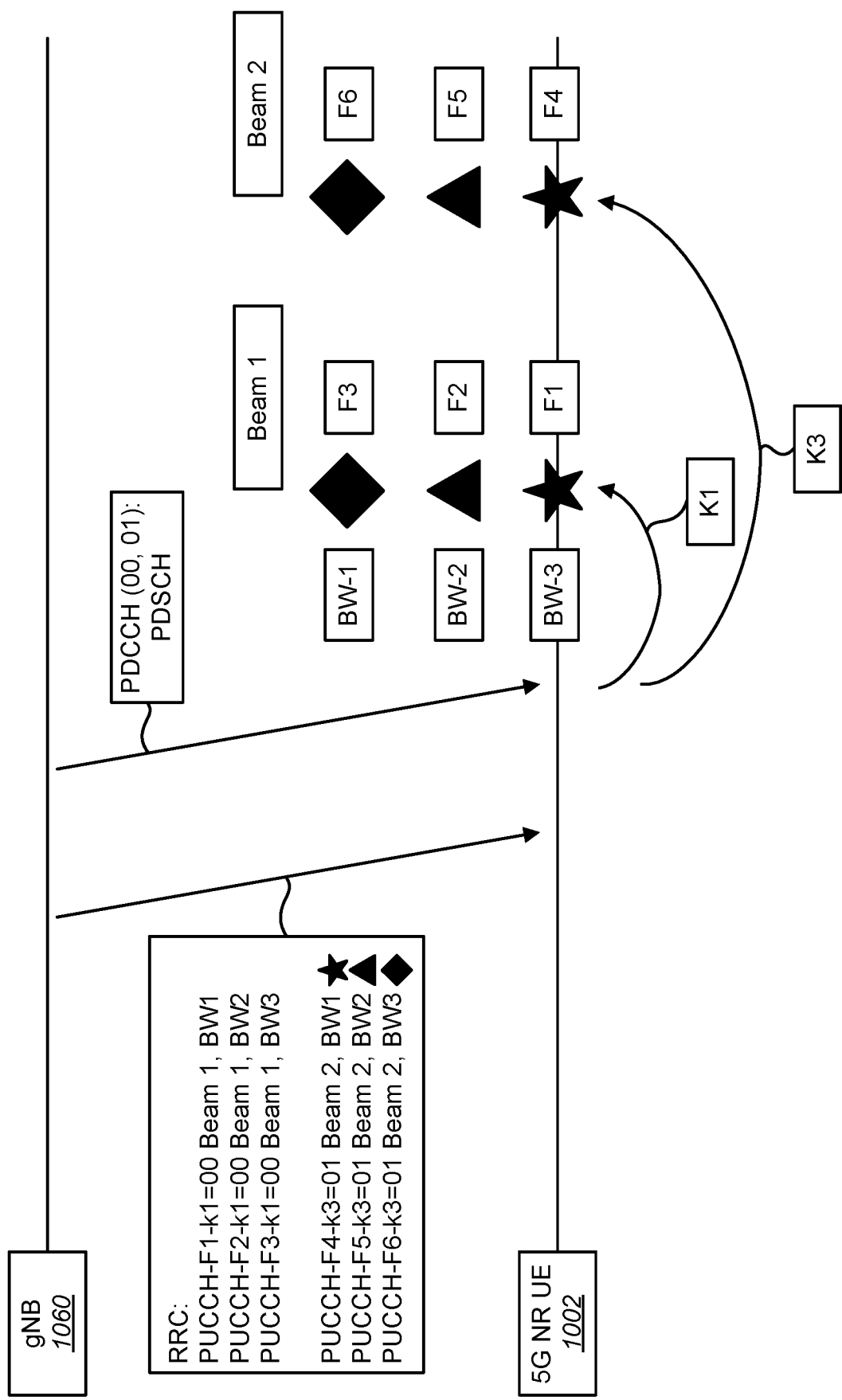
FIG. 10 is an example illustrating an SR transmission using a FDM and TDM-based priority indication for different bandwidths and beams.

The approaches described herein may be duplicated to indicate SR-configurations for different information (e.g., BWP, bandwidth requirements, different services, different numerologies, different beams, etc.). FIG. 7 is an example illustrating an SR transmission using a TDM-based priority indication for different bandwidths. FIG. 8 is an example illustrating an SR transmission using a FDM and TDM-based priority indication for different bandwidths/BWP and services. FIG. 9 is an example illustrating an SR transmission using a FDM and TDM-based priority indication for different bandwidths and numerologies (which is referred to as BWP). FIG. 10 is an example illustrating an SR transmission using a FDM and TDM-based priority indication for different bandwidths/BWP and beams.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling request module 194. The gNB scheduling request module 194 may perform scheduling request operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
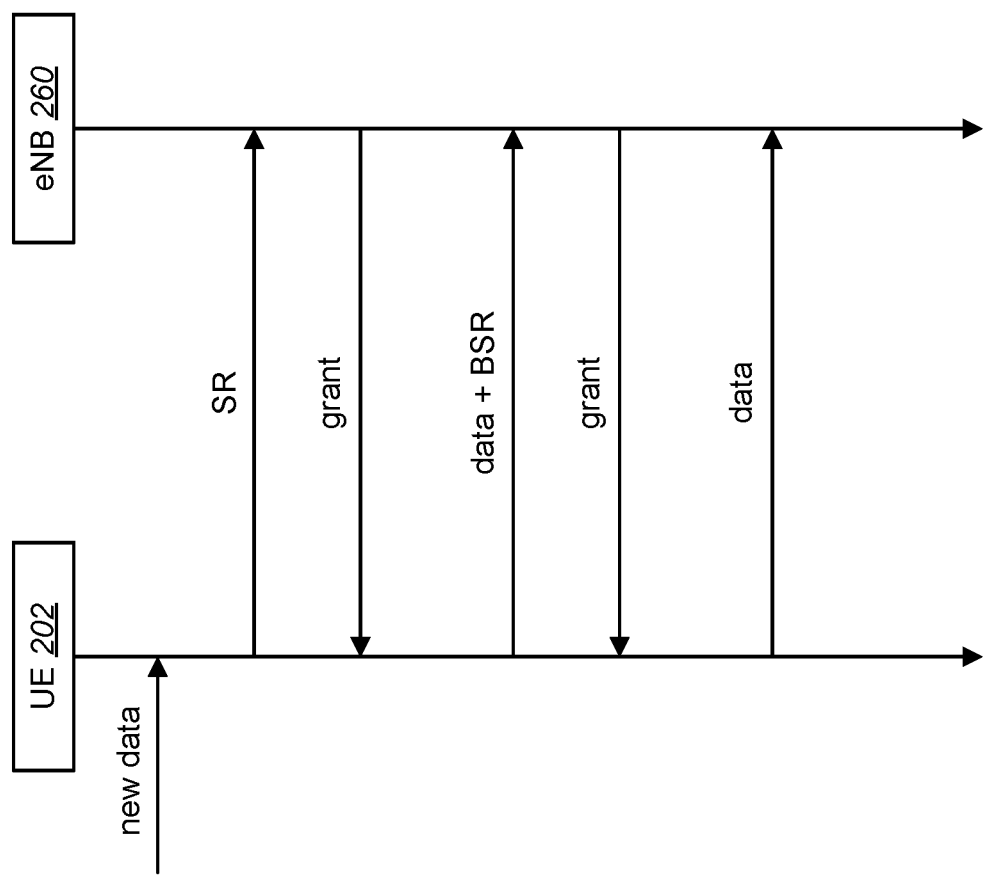
FIG. 2 is a call flow diagram illustrating a scheduling procedure for dynamic scheduling in LTE.

FIG. 2 is a call flow diagram illustrating a scheduling procedure for dynamic scheduling in LTE. When the UE 202 has new data, the UE 202 may send a scheduling request (SR) to the eNB 260. The eNB 260 may respond to the SR by sending a grant to the UE 202. The eNB 260 provides a default UL grant which is used by the UE 202 to transmit the data and/or BSR.

In response to the BSR, the eNB 260 sends another grant. The UE 202 then sends the remaining data to the eNB 260.

A BSR indicates buffer size for each LCG. However, the BSR requires a grant for transmission so it may take a longer time until the eNB 260 receives it, since it is preceded by an SR. It may be case that the provided grant is enough to transmit all data. However, as seen in FIG. 2, it is also likely that a grant is not enough and the UE 202 has to request another grant using BSR. The consequence of this process is additional delay for the case when UE 202 would have been able to transmit all data, had the first UL grant been little bit larger.

As shown in FIG. 2, the complex signaling interaction procedure of SR-UL grant-BSR-UL grant-Data results in latency, processing and signaling overhead. The usages of SR and BSR are limited which cannot provide a better QoS for diverse services in NR.

Figure 3A:
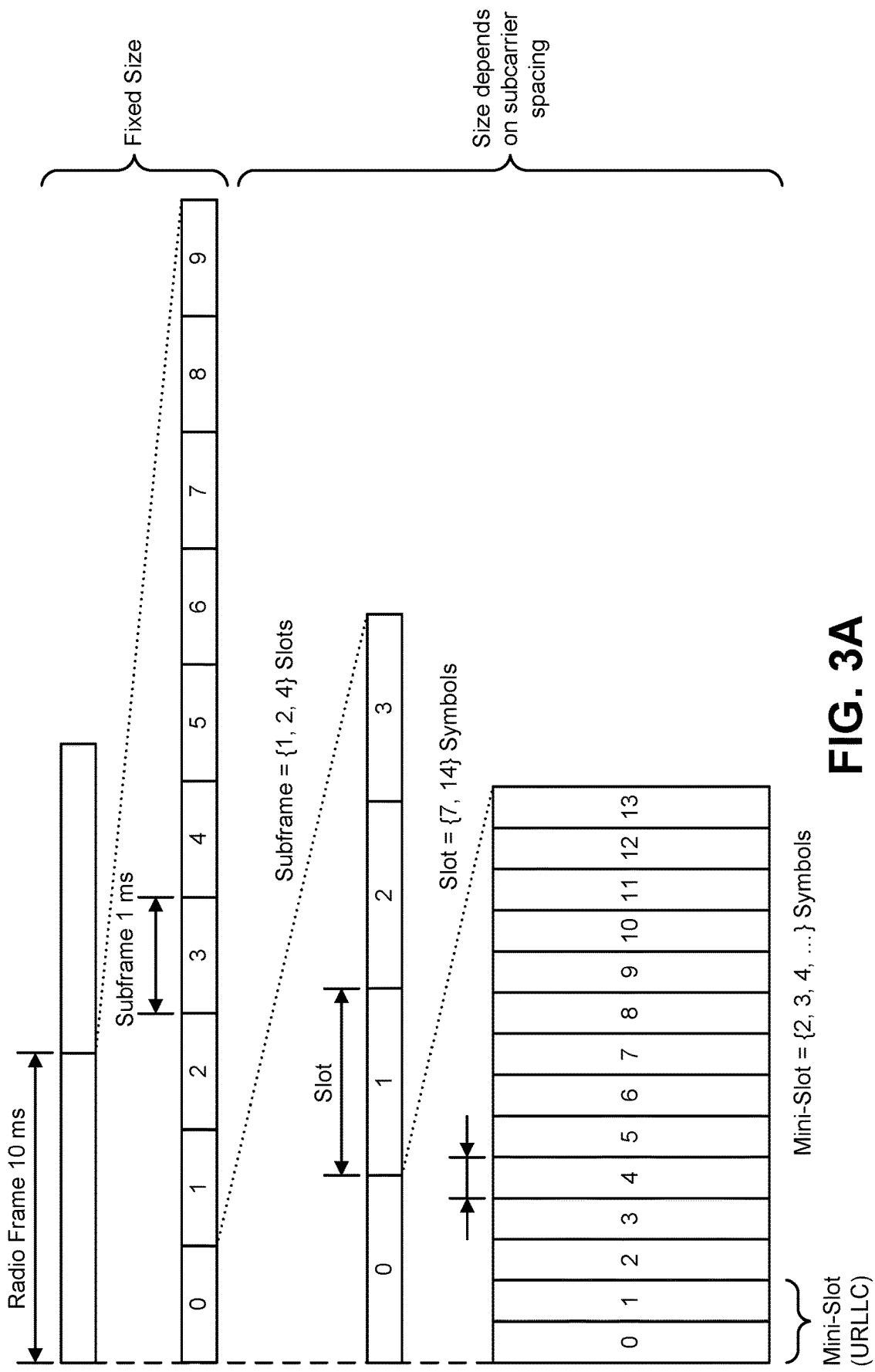
FIG. 3A is an example illustrating variable frame structure in 5G NR.

FIG. 3A is an example illustrating variable frame structure in 5G NR.

Figure 3B:
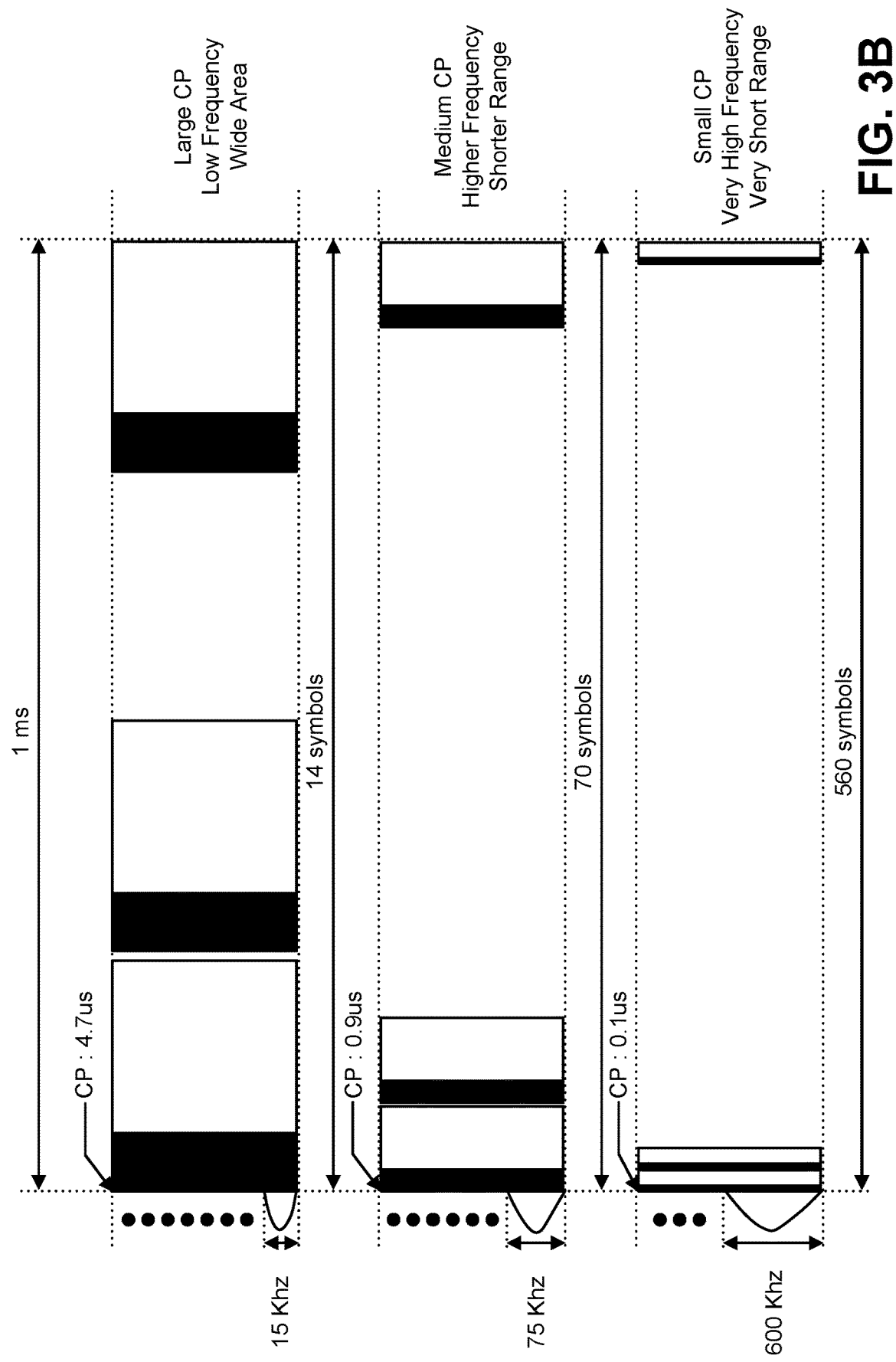
FIG. 3B is an example illustrating variable slot size in 5G NR.

FIG. 3B is an example illustrating variable slot size in 5G NR.

Figure 3C:
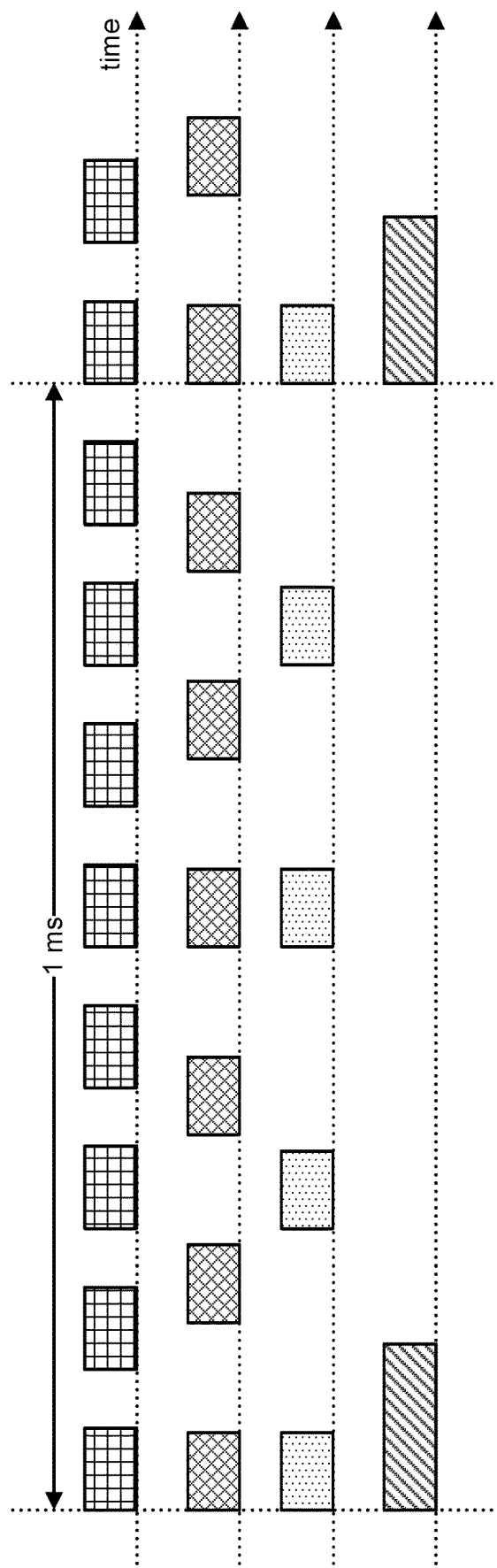
FIG. 3C is an example illustrating variable PUCCH periodicity in 5G NR.

FIG. 3C is an example illustrating variable PUCCH periodicity in 5G NR.

FIG. 4 is an example illustrating an SR transmission using a time division multiplexing (TDM)-based priority indication. A gNB 460 may communicate with a 5G NR UE 402.

The SR may be used for, at least, requesting Uplink Shared Channel (UL-SCH) resources for new transmission (i.e., an initial transmission) and/or retransmission. The new transmission and/or the transmission described herein may be assumed to be included in the transmission (i.e., UL-SCH transmission and/or PUSCH transmission) in some implementations for the sake of simple description.

As shown by FIG. 4, the gNB 460 may configure physical uplink channel resources used for the SR transmission. For example, the gNB 460 may configure physical uplink control channel resources (i.e., PUCCH resources) used for the SR transmission. Here, the PUCCH resources may be used for transmission of Uplink Control Information (UCI). The UCI may include HARQ-ACK (a positive acknowledgment or a negative acknowledgment), CSI (Channel State Information), and/or the SR.

Also, physical uplink channel resources different from the PUCCH resources may be defined for the SR transmission (and/or the UCI transmission). For example, physical uplink channel resources used only for the SR transmission may be defined, and the gNB 460 may configure physical uplink channel resources used only for the SR transmission. The physical uplink channel resources used for the SR transmission described herein may be assumed to be included in the PUCCH resources in some implementations for the sake of simple description.

In an example, the gNB 460 may configure one or more PUCCH resources by using a Radio Resource Control message (RRC message). Here, the RRC message may be included in a higher layer signal. The gNB 460 may transmit the RRC message including one or more information used for configuring a periodicity (i.e., an interval), an offset (i.e., an offset value), an index of the PUCCH resources, and/or a position(s) of the PUCCH resources (e.g., time resources, frequency resources, and/or code resources).

The PUCCH resources used for the SR transmission may be configured based the periodicity, the offset, the index of the PUCCH resources, and/or the position(s) of the PUCCH resources. Here, the configuration used for configuring the periodicity, the offset, the index of the PUCCH resources, and/or the position(s) of PUCCH resources described herein may be assumed to be included in a SR configuration in some implementations for the sake of simple description. Therefore, the UE 402 may transmit the SR based on the SR configuration. The UE 402 may transmit the SR on the PUCCH based on the SR configuration.

The gNB 460 may transmit the RRC message including one or more SR configurations. As one example, FIG. 4 shows that the gNB 460 configures, by using the one or more SR configurations, three PUCCH resources: PUCCH-1, PUCCH-2, and PUCCH-3. For example, the gNB 460 may configure, by using a first SR configuration, the PUCCH-1. The gNB 460 may configure, by using a second SR configuration, the PUCCH-2. The gNB 460 may configure, by using a third SR configuration, the PUCCH-3.

Each of the one or more SR configurations may correspond to one or more information indicated (e.g., expressed) by the SR bit(s). For example, each of the one or more SR configurations may correspond to a priority. In an implementation, each of the one or more PUCCH resources configured based on the SR configuration(s) may correspond to a priority. In another implementation, each of one or more subframes (or slots, or mini-slots, or symbols) configured based on the SR configuration(s) for the SR transmission may be correspond to a priority. Here, the priority may include a priority of the transmission which corresponds to the SR bit(s) (i.e., the transmitted SR).

The priority may include a priority of UL-SCH resources that are requested for the transmission. For example, the PUCCH-1 (or the first SR configuration) may correspond to a high priority (represented in FIG. 4 by a star), the PUCCH-2 (or the second SR configuration) may correspond to a medium priority (represented in FIG. 4 by a triangle), and the PUCCH-3 (or the third SR configuration) may correspond to a low priority (represented in FIG. 4 by a diamond).

Here, a part of the SR configurations (e.g., the periodicity, the offset value, and/or the position(s) of the PUCCH resources) may be set by a subframe level, a slot level, a mini-slot level, and/or a symbol level. Namely, an instance(s) for the SR transmission may be set by a subframe level, a slot level, a mini-slot level, and/or a symbol level.

In an example, a periodicity of a mini-slot (and/or a symbol), an offset of a mini-slot (and/or a symbol), and/or a position(s) of a mini-slot (and/or a symbol) for the PUCCH-1 (i.e., the PUCCH resource of the high priority) may be configured based on the first SR configuration. Also, a periodicity of a slot, an offset of a slot, and/or a position(s) of a slot for the PUCCH-2 (i.e., the PUCCH resource of the medium priority) may be configured based on the second SR configuration. Also, a periodicity of a subframe, an offset of a subframe, and/or a position(s) of a subframe for the PUCCH-3 (i.e., the PUCCH resource of the low priority) may be configured based on the third SR configuration. Namely, a time duration of the instance(s) for the SR transmission may correspond to a priority.

The UE 402 may transmit, based on the SR configuration and/or the priority, the SR (the SR bit(s)) on a corresponding PUCCH. For example, in a case of the higher priority, the UE 402 may select (determine) the PUCCH-1, and use the PUCCH-1 to transmit the SR (i.e., the PUCCH-1 may be used as PUCCH resources for the SR transmission). Also, in a case of the medium priority, the UE 402 may select (determine) the PUCCH-2, and use the PUCCH-2 to transmit the SR (i.e., the PUCCH-2 may be used as the PUCCH resources for the SR transmission). Also, in a case of the low priority, the UE 402 may select (determine) the PUCCH-3, and use the PUCCH-3 to transmit the SR (i.e., the PUCCH-3 may be used as the PUCCH resources for the SR transmission).

Here, for example, one-bit SR (e.g., '0' indicating a negative, and/or '1' indicating a positive) may be transmitted. Also, an on-off keying may be used for the SR transmission. Namely, the UE 402 may transmit the SR in a case that UL-SCH resources are requested, and may not transmit the SR in a case that UL-SCH resources are not requested. Also, a multi-bit SR may be transmitted.

Furthermore, the SR may be transmitted together with the HARQ-ACK and/or the CSI on the PUCCH. For example, the SR may be multiplexed with the HARQ-ACK and/or the CSI on the PUCCH. Also, the SR may be transmitted on the first PUCCH and the HARQ-ACK and/or the CSI may be transmitted on the second PUCCH (i.e., the simultaneous transmission of multiple PUCCHs).

The gNB 460 may transmit in the RRC message information that indicates whether simultaneous transmission of multiple PUCCHs is allowed or not. For example, the gNB 460 may transmit the RRC message including information indicating whether simultaneous transmission of the HARQ-ACK and the SR on multiple PUCCHs is allowed or not. Also, the gNB 460 may transmit the RRC message including information indicating whether simultaneous transmission of the HARQ-ACK and the CSI on multiple PUCCHs is allowed or not. Also, the gNB 460 may transmit the RRC message including information indicating whether simultaneous transmission of the SR and the CSI on multiple PUCCHs is allowed or not.

FIG. 5 is an example illustrating an SR transmission using a frequency division multiplexing (FDM)-based priority indication. A gNB 560 may communicate with a 5G NR UE 502 on the available resources (i.e., Frequencies) for sending SR.

Here, the SR transmission explained by FIG. 5 may be performed (occurs) in a subframe which is configured for the SR transmission (e.g., based on the SR configuration). In an example, the SR transmission explained by FIG. 5 may be performed (occurs) in a case that the SR transmission coincides in time with the transmission of the HARQ-ACK. In another, the SR transmission explained by FIG. 5 may be performed (occurs) in a case that the transmission of the HARQ-ACK coincides with a subframe configured to the UE 502 for the SR transmission (e.g., based on the SR configuration).

As shown by FIG. 5, the gNB 560 may configure, by using the RRC message, one or more PUCCH resources (e.g., 2 sets of PUCCH resources, and each set may include three (or four) PUCCH resources). Furthermore, the gNB 560 may indicate, by using Downlink Control Information (DCI, DCI format), one or more PUCCH resources among the one or more PUCCH resources configured by using the RRC message. Here, for example, the DCI may be used for scheduling of a physical downlink shared channel (i.e., PDSCH).

Also, the PDSCH may be scheduled in a subframe, a slot, a mini-slot, and/or a symbol. For example, the first DCI used for scheduling of the PDSCH in a subframe may be defined. Also, the second DCI used for scheduling of the PDSCH in a slot, a mini-slot, and/or a symbol may be defined. Also, the DCI may be transmitted on a physical downlink control channel (i.e., PDCCH, first PDCCH). Also, the DCI may be transmitted on a physical downlink channel (second PDCH) different from the PDCCH. For example, a value of a field of the DCI (2-bit field of DCI) may be used for indicating the one or more PUCCH resources among the one or more PUCCH resources configured by using the RRC message.

Here, the PUCCH resources configured by using the RRC message described herein may be assumed to be a set 'A' of PUCCH resources in some implementations for the sake of simple description. Also, the PUCCH resources indicated, among the set 'A' of PUCCH resources, by using the DCI described herein may be assumed to be a set 'B' of PUCCH resources in some implementations for the sake of simple description.

In an example, a value of the first field of the DCI (e.g., the 2-bit field of the DCI) may be used for indicating the set 'B' of PUCCH resources in a case that a value of the second field of the DCI (e.g., 1-bit field of the DCI) may be set a predetermined value (e.g., 1-bit field is set to '1'). In another example, the second field of the DCI (e.g., 1-bit field of the DCI) may be a field used for indicating (requesting) the HARQ-ACK transmission (e.g., indicating (requesting) the HARQ-ACK transmission on PUCCH).

The UE 502 may transmit the HARQ-ACK (e.g., on PUCCH) based on the value of the second field of the DCI. The HARQ-ACK may correspond to the PDSCH scheduled by using the DCI including the value of the second field.

Also, the SR may be transmitted together with the HARQ-ACK that corresponds to the PDSCH scheduled by using the DCI including the value of the second field. Namely, the UE 502 may determine the set 'B' of PUCCH resources to transmit the HARQ-ACK (the HARQ-ACK and/or the SR). Also, the UE 502 may determine the set 'B' of PUCCH resources to transmit the HARQ-ACK and/or the SR.

For example, as shown by FIG. 5, the gNB 560 may configure, by using the RRC message, a first PUCCH resource value (e.g., first PUCCH resource index, F1), second PUCCH resource value (e.g., second PUCCH resource index, F2), and third PUCCH resource value (e.g., third PUCCH resource index, F3). Also, the gNB 560 may configure, by using the RRC message, first transmission timing (e.g., first timing offset, k1), second transmission timing (e.g., second timing offset, k2), and third transmission timing (e.g., third timing offset, k3). In an implementation, K1=n+3, K2=n+4, K3=n+5, where n is the subframe in which a PDCCH is transmitted.

In FIG. 5, PUCCH-F1-k1, PUCCH-F2-k2, PUCCH-F3-k3 may be included in the first set of PUCCH resources among the set 'A' of PUCCH resources. The first set of PUCCH resources may correspond to a first value of the field of the DCI (e.g., '00' of the 2-bit field of the DCI). Also, PUCCH-F4-k2, PUCCH-F5-k2, PUCCH-F6-k2 may be included in second set of PUCCH resources among the set 'A' of PUCCH resources. The second set of PUCCH resources may correspond to a second value of the field of the DCI (e.g., '01' of the 2-bit field of the DCI).

Furthermore, each of the one or more PUCCH resources included in the first set of PUCCH resource may correspond to one or more information indicated (expressed) by the SR bit(s). Also, each of the one or more PUCCH resources included in the second set of PUCCH resource may correspond to one or more information indicated (expressed) by the SR bit(s).

In an example, each of the one or more PUCCH resources included in each of set of PUCCH resources may correspond to a priority. For example, the PUCCH-F1-k1 included in the first set of PUCCH resources may correspond to the high priority. The PUCCH-F2-k2 included in the first set of PUCCH resources may correspond to the medium priority. The PUCCH-F3-k3 included in the first set of PUCCH resources may correspond to the low priority.

The PUCCH-F4-k2 included in the second set of PUCCH resources may correspond to the high priority (as indicated by a star in FIG. 5). Also, the PUCCH-F5-k2 included in the second set of PUCCH resources may correspond to the medium priority (as indicated by a triangle in FIG. 5). Also, the PUCCH-F6-k2 included in the second set of PUCCH resources may correspond to the low priority (as indicated by a diamond in FIG. 5).

For example, the gNB 560 may transmit DCI including the field set to a value '01' (i.e., the value '01' to which the field of the DCI is mapped). The UE 502 may transmit, based on the SR configuration, the value of the field of the DCI, and/or the priority, the SR (the SR bit(s)) on a corresponding PUCCH (i.e., on PUCCH with a corresponding PUCCH resource value, and/or in a corresponding transmission timing). For example, in a case of the high priority, the UE 502 may select (i.e., determine) PUCCH-F4-k2 (i.e., the PUCCH resource value 'F4', and/or the transmitting timing 'k2') and use PUCCH-F4-k2 to transmit the SR (e.g., the transmission of the HARQ-ACK and the SR using PUCCH-F4-k2 may be performed).

In a case of the medium priority, the UE 502 may select (i.e., determine) PUCCH-F5-k2 (i.e., the PUCCH resource value 'F5', and/or the transmitting timing 'k2') and use PUCCH-F5-k2 to transmit the SR (e.g., the transmission of the HARQ-ACK and the SR using PUCCH-F5-k2 may be performed). In a case of the low priority, the UE 502 may select (i.e., determine) PUCCH-F6-k2 (i.e., the PUCCH resource value 'F6', and/or the transmitting timing 'k2') and use PUCCH-F6-k2 to transmit the SR (e.g., the transmission of the HARQ-ACK and the SR using PUCCH-F6-k2 may be performed).

Also, the priority may correspond to the DCI (e.g., the detected DCI, the detected DCI format, the first PDCCH, and/or the second PDCH). For example, the UE 502 may transmit, based on a detection of the first DCI, the first DCI format, and/or the first PDCCH, the SR on the PUCCH (e.g., the SR indicating the low priority). Also, for example, the UE 502 may transmit, based on a detection of the second DCI, the second DCI format, and/or the second PDCH, the SR on the PUCCH (the SR indicating the medium priority). Also, for example, the UE 502 may transmit, based on a detection of the third DCI, the third DCI format, and/or the third PDCH, the SR on the PUCCH (the SR indicating the high priority).

Here, for example, a one-bit SR (e.g., '0' indicating a negative, and/or '1' indicating a positive) may be transmitted. Also, an on-off keying may be used for the SR transmission. Namely, the UE 502 may transmit the SR in a case that UL-SCH resources are requested, and may not transmit the SR in a case that UL-SCH resources are not requested. Also, multi-bit SR may be transmitted.

Furthermore, the SR may be transmitted together with the HARQ-ACK and/or the CSI on the PUCCH. For example, the SR may be multiplexed with the HARQ-ACK and/or the CSI on the PUCCH. Also, the SR may be transmitted on the first PUCCH and the HARQ-ACK and/or the CSI may be transmitted on the second PUCCH (i.e., the simultaneous transmission of multiple PUCCHs).

FIG. 6A is an example illustrating an SR transmission using a FDM and TDM-based priority indication. A gNB 660 may communicate with a 5G NR UE 602.

As described above, the gNB 660 may transmit the RRC message including the one or more SR configurations. And, for example, each of the SR configuration(s) may be correspond to the priority. Also, for example, each of subframes (or slots, or mini-slots, or symbols) configured based on the SR configuration(s) for the SR transmission may be correspond to the priority.

Furthermore, as described above, the gNB 660 may transmit the RRC message including information used for configuring the set 'A' of PUCCH resources, and the DCI indicating the set 'B' of PUCCH resources among the set 'A' of PUCCH resources. For example, the three (or four) PUCCH resource values may be configured by using the RRC message, and the one PUCCH value among the three (or four) PUCCH resource values may be indicated by using the DCI (e.g., the value of the field of the DCI). The UE 602 may determine the one PUCCH value from one of the three (or four) PUCCH resource values.

Here, for example, in FIG. 6A, the priority of a subframe corresponding to k1 (e.g., a first subframe configured for the SR transmission) may be configured based on the SR configuration as the high priority (represented by a star) and/or the medium priority (represented by a triangle). Also, in FIG. 6A the priority of a subframe corresponding to k3 (e.g., a second subframe configured for the SR transmission) may be configured based on the SR configuration as the high priority, the medium priority, and/or the low priority (represented by a diamond). Furthermore, the value(s) of the field of the DCI may be set to '00' and/or '01' to indicate the availability of two different combinations of PUCCH configurations (i.e., 2 different transmission times; K1 and K3 and for each there are 3 different frequencies F1, F2, F3) to indicate different attributes (6 in this case) regarding the requested Bandwidth. For example, K1 represents lower bandwidth and F3 represents higher priority.

The UE 602 may transmit, based on the SR configuration, the value(s) of the field of the DCI, and/or the priority, the SR (the SR bit(s)) on a corresponding PUCCH. For example, in a case of the high priority, the UE 602 may select (determine) the PUCCH-F1-k1 and/or the PUCCH-F4-k3, and use the PUCCH-F1-k1 and/or the PUCCH-F4-k3 to transmit the SR (e.g., the transmission of the HARQ-ACK and the SR using the PUCCH-F1-k1 and/or the PUCCH-F4-k3 may be performed). In an implementation, K1=n+3, K2=n+4, K3=n+5, where n is the subframe in which a PDCCH is transmitted.

In a case of the medium priority, the UE 602 may select (determine) the PUCCH-F2-k1 and/or the PUCCH-F5-k3, and use the PUCCH-F2-k1 and/or the PUCCH-F5-k3 to transmit the SR (e.g., the transmission of the HARQ-ACK and the SR using the PUCCH-F2-k1 and/or the PUCCH-F5-k3 may be performed).

In a case of the low priority, the UE 602 may select (determine) the PUCCH-F6-k3, and use the PUCCH-F6-k3 to transmit the SR (e.g., the transmission of the HARQ-ACK and the SR using the PUCCH-F6-k3 may be performed). Here, because of the priority of the subframe corresponding to the k1 is not configured as the low priority, the UE 602 may not select the PUCCH-F3-k1 for the SR transmission. Namely, the UE 602 may transmit the SR on the PUCCH resources for which the corresponding priority for a particular Bandwidth is configured.

The UE 602 may transmit the SR on the PUCCH resources in a subframe for which the corresponding priority is configured. Namely, as described above, for example, the UE 602 may not select the PUCCH resources of the low priority in a case that the subframe (and/or the PUCCH resources) is not configured for the transmission of the SR indicating the low priority. And, in this case, the UE 602 may select only the PUCCH resources of the high priority and/or the medium priority.

Here, for example, one-bit SR (e.g., '0' indicating a negative, and/or '1' indicating a positive) may be transmitted. Also, an on-off keying may be used for the SR transmission. Namely, the UE 602 may transmit the SR in a case that UL-SCH resources are requested, and may not transmit the SR in a case that UL-SCH resources are not requested. Also, multi-bit SR may be transmitted. Also, the SR may be transmitted together with the HARQ-ACK and/or the CSI on the PUCCH. For example, the SR may be multiplexed with the HARQ-ACK and/or the CSI on the PUCCH. Also, the SR may be transmitted on the first PUCCH and the HARQ-ACK and/or the CSI may be transmitted on the second PUCCH (i.e., the simultaneous transmission of multi PUCCHs).

In FIGS. 4-6A, the priority is described. But, other information different from the priority is not precluded in this disclosure. For example, the priority may be replaced by a type of traffic characteristic and/or a type of traffic service. Namely, the high priority may be replaced by a first type of traffic characteristic and/or a first type of traffic service. Also, the medium priority may be replaced by a second type of traffic characteristic and/or a second type of traffic service. Also, the low priority may be replaced by a third type of traffic characteristic and/or a third type of traffic service.

In another example, the priority may be replaced by a type of logical channel and/or a type of logical channel group (LCG). Namely, the high priority may be replaced by a first type of logical channel and/or a first type of LCG. Also, the medium priority may be replaced by a second type of logical channel and/or a second type of LCG. Also, the low priority may be replaced by a third type of logical channel and/or a third type of LCG.

In another example, the priority may be replaced by an amount of the data (the amount of the data (the bits) available) associated to that logical channel (or LCG). Namely, the high priority may be replaced by first amount of data available associated to that logical channel (or LCG). Also, the medium priority may be replaced by second amount of data available associated to that logical channel (or LCG). Also, the low priority may be replaced by third amount of data available associated to that logical channel (or LCG).

In another example, the priority may be replaced by a buffer size (the buffer size associated to that logical channel (or LCG)). Namely, the high priority may be replaced by a first buffer size. Also, the medium priority may be replaced by a second buffer size. Also, the low priority may be replaced by a third buffer size.

Also, in another example, the priority may be replaced by a service type. Namely, the high priority may be replaced by a first service type. Also, the medium priority may be replaced by a second service type. Also, the low priority may be replaced by a third service type.

In another example, the priority may be replaced by a numerology (e.g., a subcarrier spacing for the transmission) and/or a transmission time interval (TTI) duration. Namely, the high priority may be replaced by a first numerology (e.g., 15 kHz subcarrier spacing) and/or a first TTI (e.g., 1 ms). The medium priority may be replaced by a second numerology (e.g., 30 kHz subcarrier spacing) and/or a second TTI (e.g., 0.5 ms). The low priority may be replaced by a third numerology (e.g., 60 kHz subcarrier spacing) and/or a third TTI (0.25 ms). Here, the numerology and/or the TTI may be defined for the logical channel(s) with pending data.

Figure 6B:
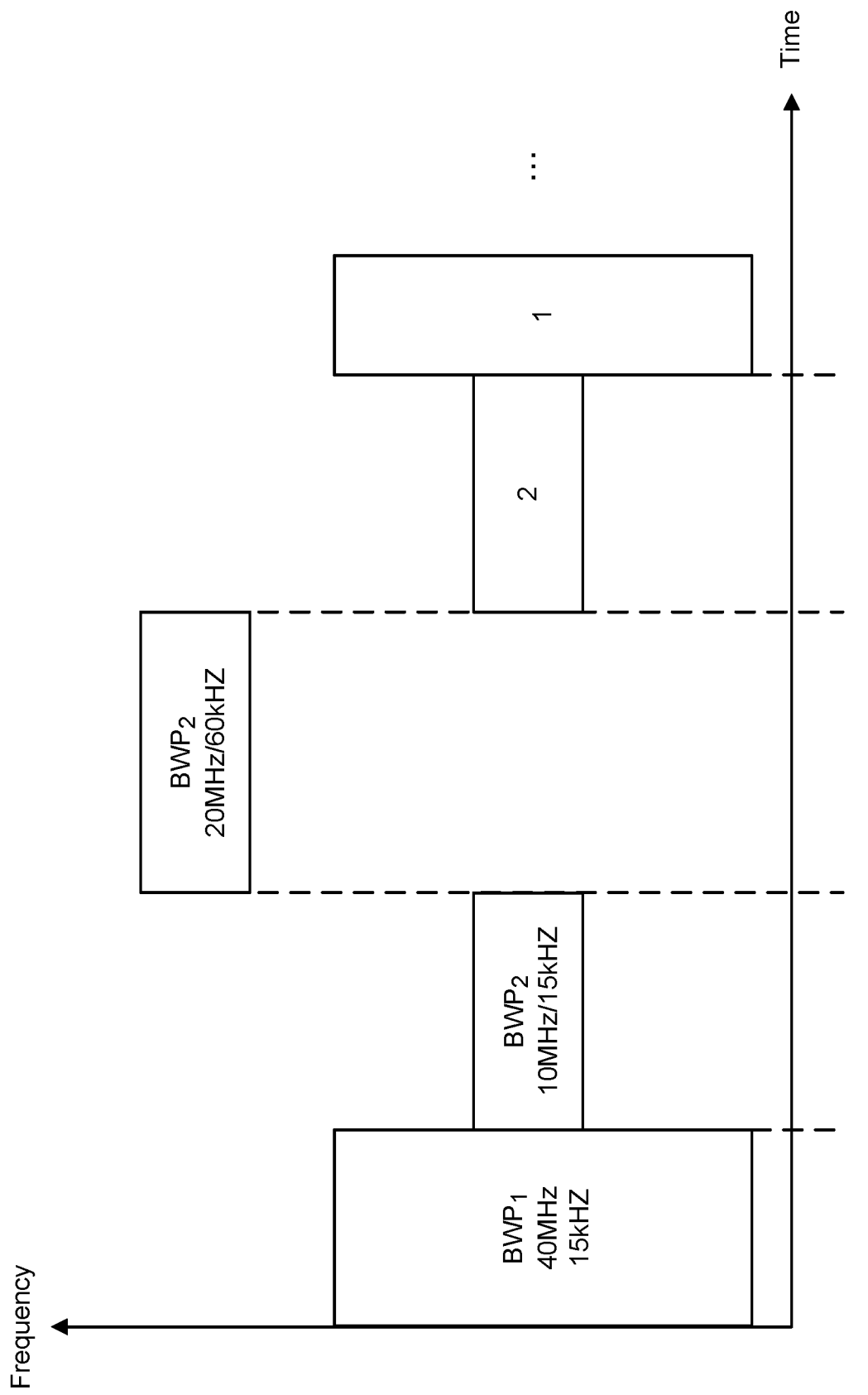
FIG. 6B is an example of bandwidth adaptations in 5G NR systems.

FIG. 6B is an example illustrating Bandwidth Adaptation in a 5G NR system. With Bandwidth Adaptation (BA), the receive and transmit bandwidth using a certain numerology such that if a UE need not be as large as the bandwidth of the cell and can be adjusted: the width can be ordered to change (e.g., to shrink during a period of low activity to save power); the location can move in the frequency domain (e.g., to increase scheduling flexibility); and the subcarrier spacing can be ordered to change (e.g., to allow different services). A subset of the total cell bandwidth and its numerologies within a cell is referred to as a Bandwidth Part (BWP) and BA is achieved by configuring the UE with BWP(s) and telling the UE which of the configured BWPs is currently the active one. FIG. 6B illustrates a scenario where 3 different BWPs are configured: BWP1 with a width of 40 MHz and subcarrier spacing of 15 kHz; BWP2 with a width of 10 MHz and subcarrier spacing of 15 kHz; BWP3 with a width of 20 MHz and subcarrier spacing of 60 kHz. In order to enable BA and special reporting of SR for that particular BWP, the gNB may configure the UE with UL and/or DL BWP pair(s) as shown in FIG. 7. Each bandwidth/BWP is uniquely identified by the gNB (i.e., BW1, BW2, . . . ) using RRC signaling.

FIG. 7 is an example illustrating an SR transmission using a TDM-based priority indication for different bandwidths. A gNB 760 may communicate with a 5G NR UE 702.

The procedures described in connection with FIG. 4 may be used. However, in this case, instead of a priority of UL-SCH resources, the RRC message may configure a bandwidth for a given PUCCH.

The priority may include a bandwidth/BWP for the transmission. For example, the PUCCH-1 (or the first SR configuration) may correspond to a high bandwidth (represented in FIG. 7 by a star), the PUCCH-2 (or the second SR configuration) may correspond to a medium bandwidth (represented in FIG. 7 by a triangle), and the PUCCH-3 (or the third SR configuration) may correspond to a low bandwidth (represented in FIG. 7 by a diamond).

FIG. 8 is an example illustrating an SR transmission using a FDM and TDM-based priority indication for different bandwidths/BWP and services. A gNB 860 may communicate with a 5G NR UE 802. Different frequencies may indicate different priorities, different times may indicate different services (e.g., URLLC).

The procedures described in connection with FIG. 6A may be used. However, in this case, instead of a priority of UL-SCH resources, the RRC message may configure a service and a bandwidth/BWP for a given PUCCH.

Here, for example, in FIG. 8, the service and bandwidth/BWP of a subframe corresponding to k1 (e.g., a first subframe configured for the SR transmission) may be configured based on the SR configuration as the high priority (represented by a star) and/or the medium priority (represented by a triangle). Also, in FIG. 8 the service and bandwidth of a subframe corresponding to k3 (e.g., a second subframe configured for the SR transmission) may be configured based on the SR configuration as the high priority, the medium priority, and/or the low priority (represented by a diamond). Furthermore, the value(s) of the field of the DCI may be set to '00' and/or '01'. In an implementation, K1=n+3, K2=n+4, K3=n+5, where n is the subframe in which a PDCCH is transmitted.

FIG. 9 is an example illustrating an SR transmission using a FDM and TDM-based priority indication for different bandwidths and numerologies (i.e, BWP). A gNB 960 may communicate with a 5G NR UE 902. Different frequencies indicate different bandwidth and different time indicates different Numerology (BWP).

The procedures described in connection with FIG. 6A may be used. However, in this case, instead of a priority of UL-SCH resources, the RRC message may configure a numerology and a bandwidth for a given PUCCH.

The priority may be replaced by a numerology (e.g., a subcarrier spacing for the transmission) and/or a transmission time interval (TTI) duration. In an example, the high priority may be replaced by a first numerology (e.g., 15 kHz subcarrier spacing) and/or a first TTI (e.g., 1 ms). Also, the medium priority may be replaced by a second numerology (e.g., 30 kHz subcarrier spacing) and/or a second TTI (e.g., 0.5 ms). Also, the low priority may be replaced by a third numerology (e.g., 60 kHz subcarrier spacing) and/or a 3rd TTI (0.25 ms). Here, the numerology and/or the TTI may be defined for the logical channel(s) with pending data.

In FIG. 9, the numerology and bandwidth (BWP) of a subframe corresponding to k1 (e.g., a first subframe configured for the SR transmission) may be configured based on the SR configuration as the high priority (represented by a star) and/or the medium priority (represented by a triangle). Also, in FIG. 9 the numerology and bandwidth (BWP) of a subframe corresponding to k3 (e.g., a second subframe configured for the SR transmission) may be configured based on the SR configuration as the high priority, the medium priority, and/or the low priority (represented by a diamond). Furthermore, the value(s) of the field of the DCI may be set to '00' and/or '01'. In an implementation, K1=n+3, K2=n+4, K3=n+5, where n is the subframe in which a PDCCH is transmitted.

FIG. 10 is an example illustrating an SR transmission using a FDM and TDM-based priority indication for different bandwidths and beams. A gNB 1060 may communicate with a 5G NR UE 1002.

The procedures described in connection with FIG. 6A may be used. However, in this case, instead of a priority of UL-SCH resources, the RRC message may configure a beam and a bandwidth/BWP for a given PUCCH.

The priority may be replaced by a beam. In an example, the high priority may be replaced by a first beam. Also, the medium priority may be replaced by a second beam. Also, the low priority may be replaced by a third beam (e.g., 60 kHz subcarrier spacing) and/or a 3rd TTI (0.25 ms). Here, the beam may be defined as a beam formation.

In FIG. 10, the beam and bandwidth/BWP of a subframe corresponding to k1 (e.g., a first subframe configured for the SR transmission) may be configured based on the SR configuration as the high priority (represented by a star) and/or the medium priority (represented by a triangle). Also, in FIG. 10 the beam and bandwidth/BWP of a subframe corresponding to k3 (e.g., a second subframe configured for the SR transmission) may be configured based on the SR configuration as the high priority, the medium priority, and/or the low priority (represented by a diamond). Furthermore, the value(s) of the field of the DCI may be set to '00' and/or '01'. In an implementation, K1=n+3, K2=n+4, K3=n+5, where n is the subframe in which a PDCCH is transmitted.

Figure 11:
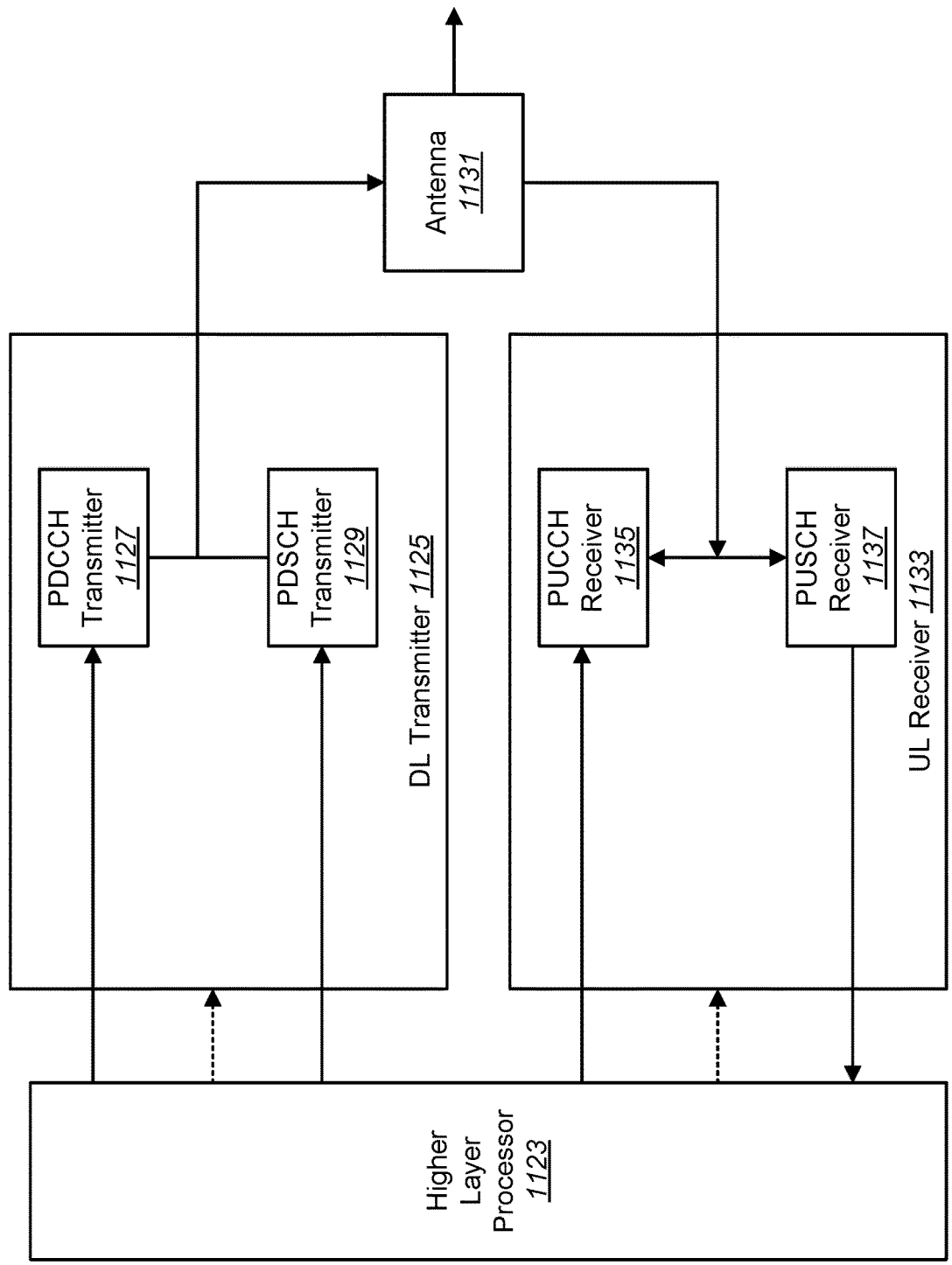
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
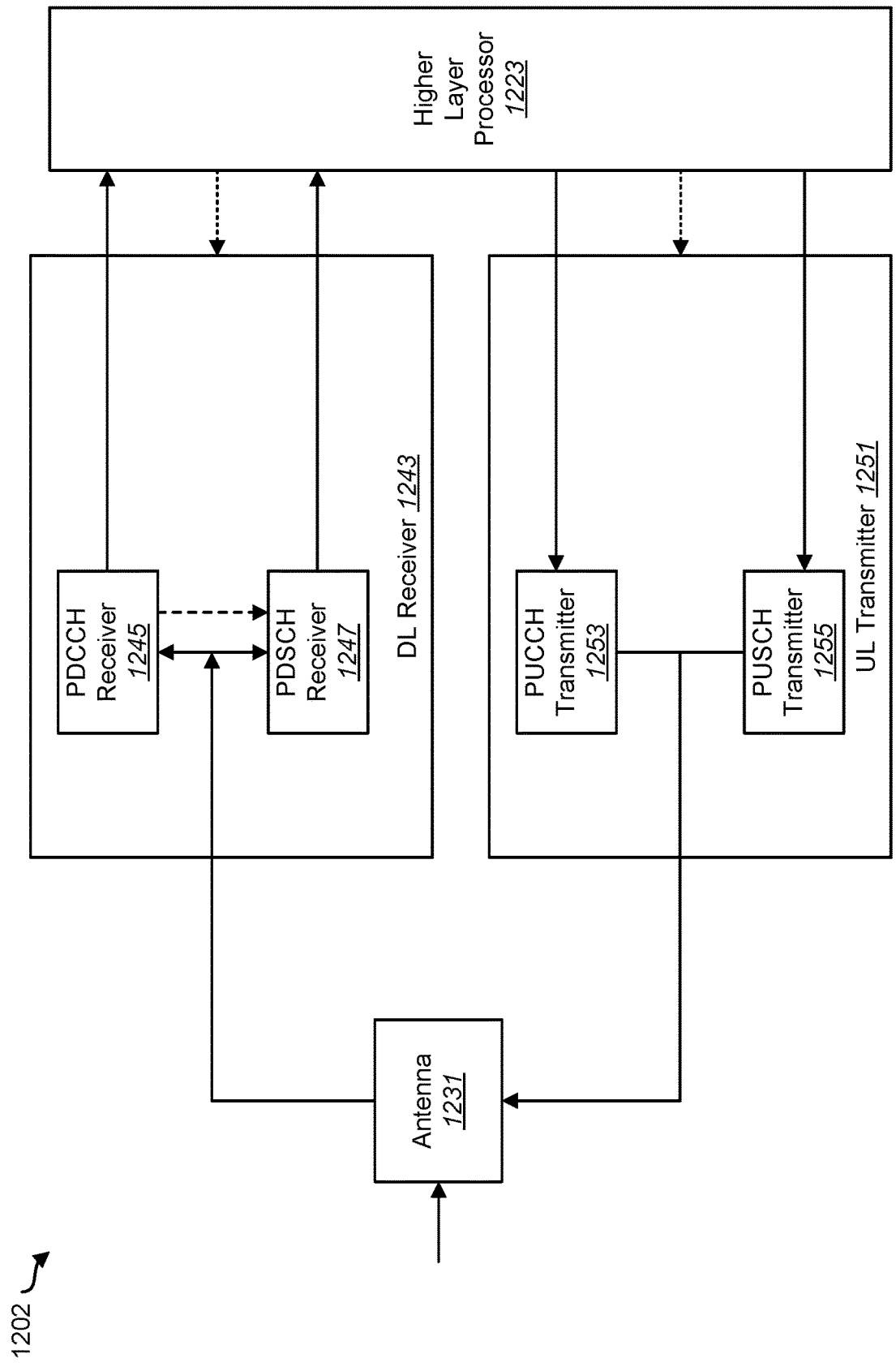
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
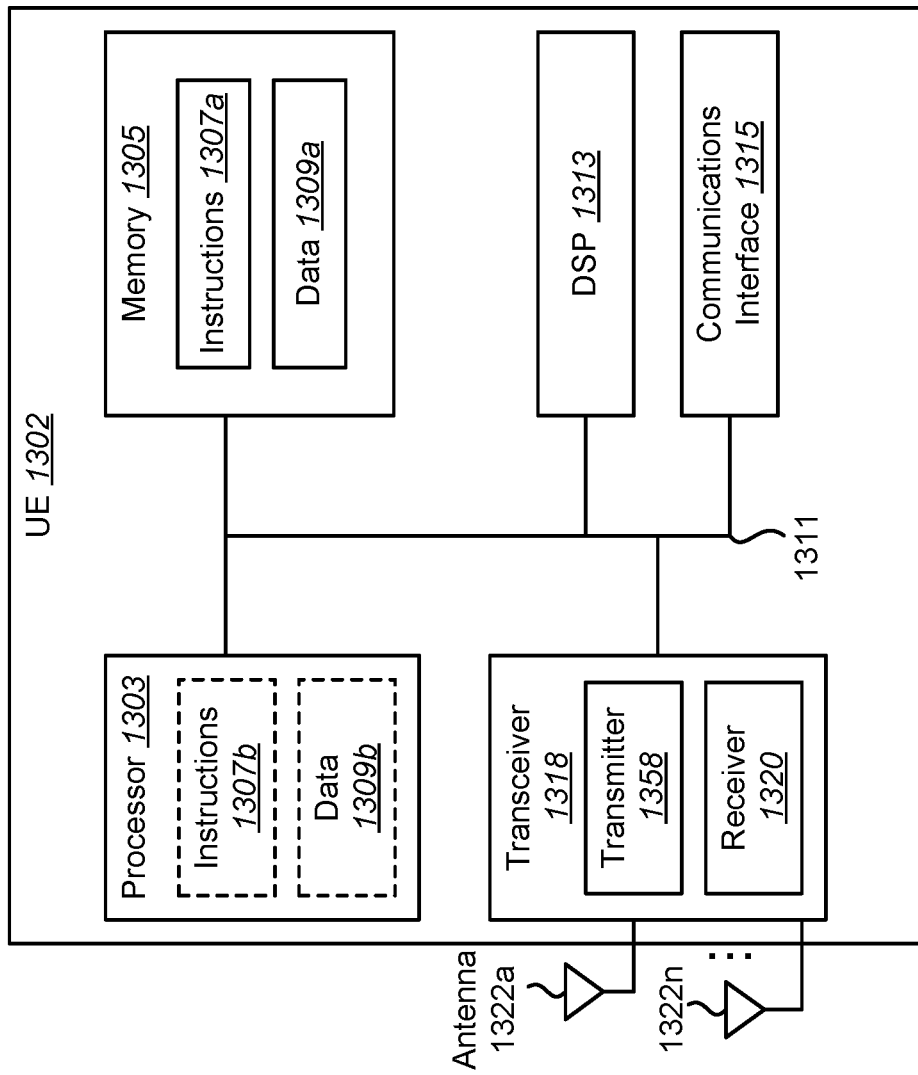
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322*a-n* are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
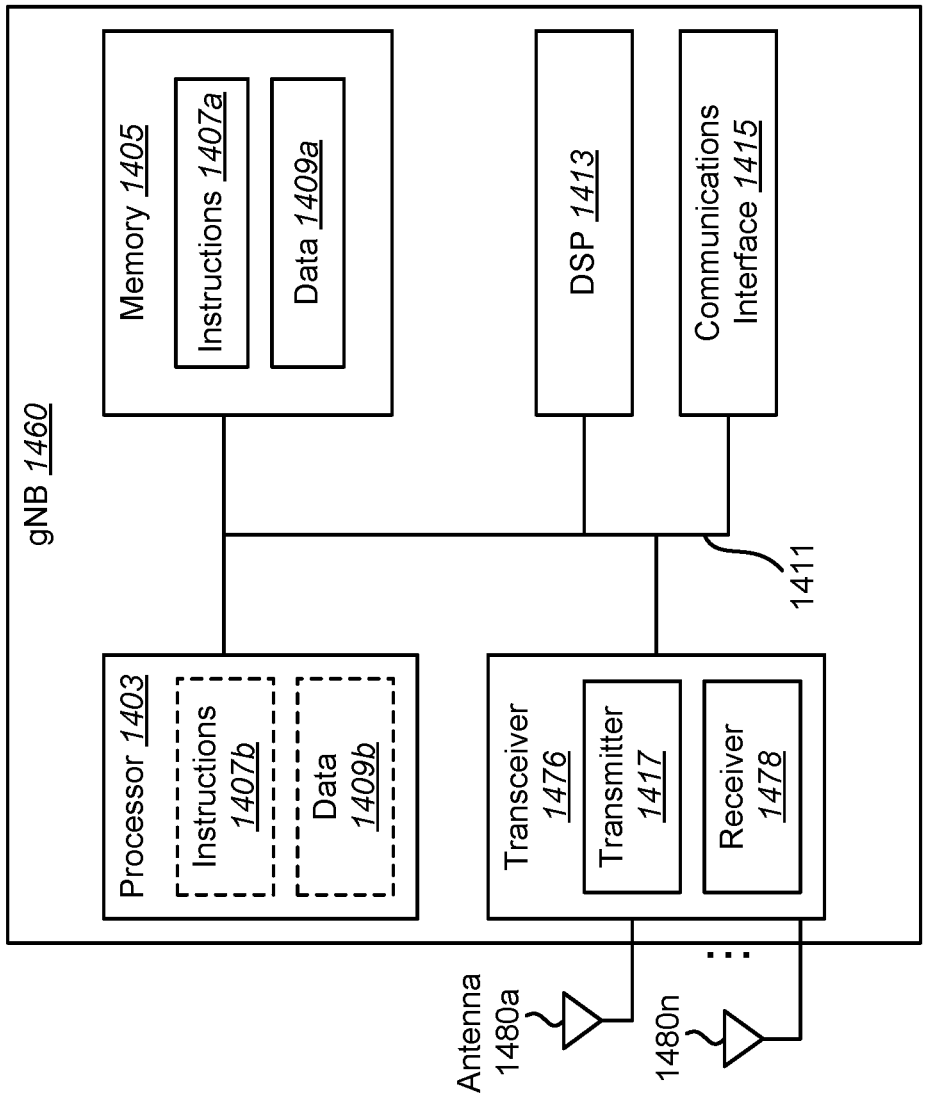
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407*a* and data 1409*a* to the processor 1403. A portion of the memory 1405 may also include non-volatile random access memory (NVRAM). Instructions 1407*b* and data 1409*b* may also reside in the processor 1403. Instructions 1407*b* and/or data 1409*b* loaded into the processor 1403 may also include instructions 1407*a* and/or data 1409*a* from memory 1405 that were loaded for execution or processing by the processor 1403. The instructions 1407*b* may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480*a-n* are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
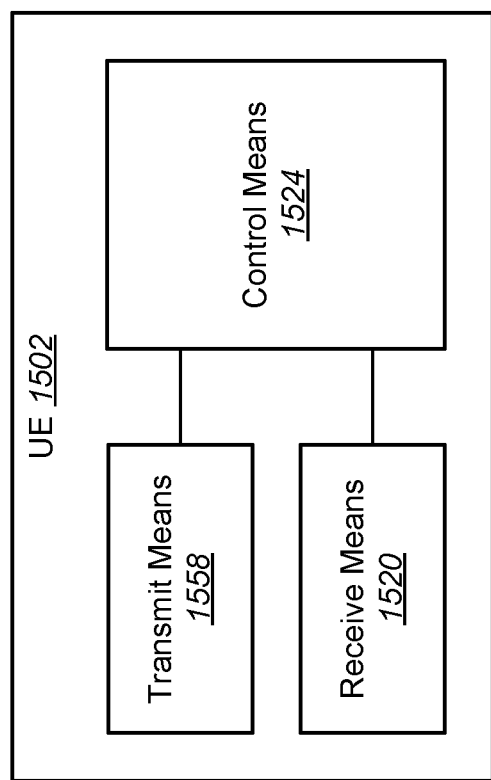
FIG. 15 is a block diagram illustrating one implementation of a UE in which systems and methods for an enhanced scheduling request may be implemented.

FIG. 15 is a block diagram illustrating one implementation of a UE 1502 in which systems and methods for an enhanced scheduling request may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
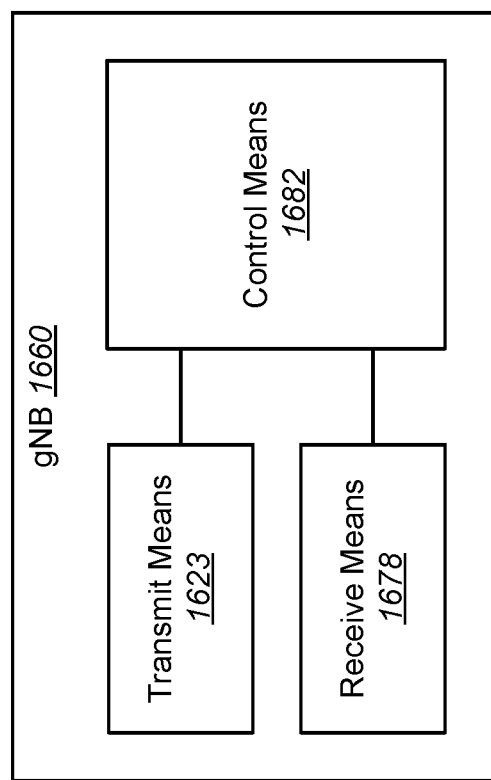
FIG. 16 is a block diagram illustrating one implementation of a gNB in which systems and methods for an enhanced scheduling request may be implemented.

FIG. 16 is a block diagram illustrating one implementation of a gNB 1660 in which systems and methods for an enhanced scheduling request may be implemented. The gNB 1660 includes transmit means 1617, receive means 1678 and control means 1682. The transmit means 1617, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
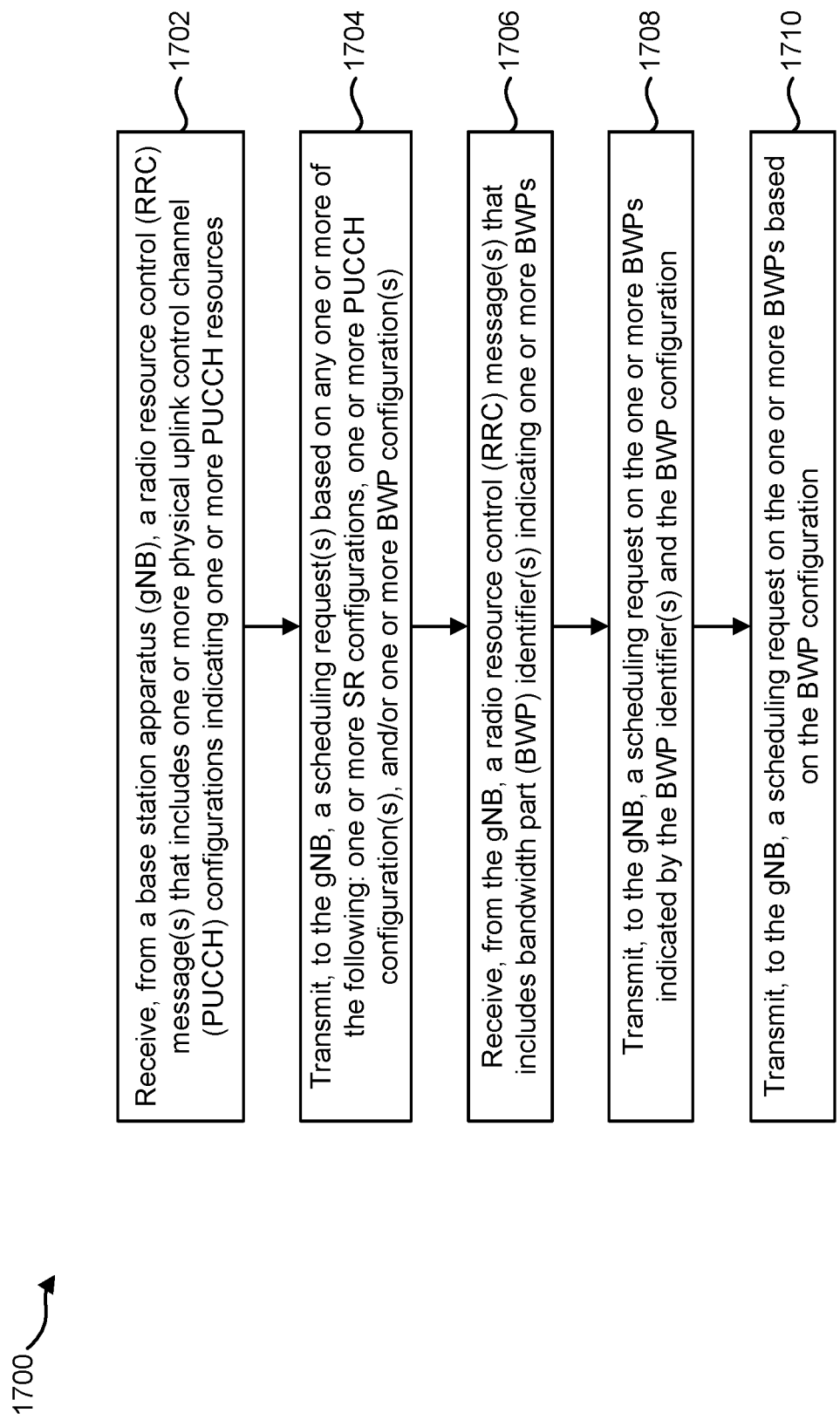
FIG. 17 is a flow diagram illustrating a communication method of a user equipment (UE)

FIG. 17 is a flow diagram illustrating a communication method 1700 of a user equipment (UE) 102. The UE 102 may receive 1702, from a base station apparatus (gNB) 160, a radio resource control (RRC) message(s) that includes one or more physical uplink control channel (PUCCH) configurations indicating one or more PUCCH resources. Each PUCCH resource may be corresponding to one or more bandwidth part (BWP) and one or more logical channel. The UE 102 may transmit 1704, to the gNB 160, a scheduling request(s) based on any one or more of the following: one or more SR configurations, one or more PUCCH configuration(s), and/or one or more BWP configuration(s). The UE 102 may receive 1706, from the gNB 160, a radio resource control (RRC) message(s) that includes bandwidth part (BWP) identifier(s) indicating one or more BWPs. The BWP configuration may be used for indicating uplink frequency location, uplink BW size, and numerology. The UE 102 may transmit 1708, to the gNB 160, a scheduling request on the one or more BWPs indicated by the BWP identifier(s) and the BWP configuration. The UE 102 may transmit 1710, to the gNB 160, a scheduling request on the one or more BWPs based on the BWP configuration.

Figure 18:
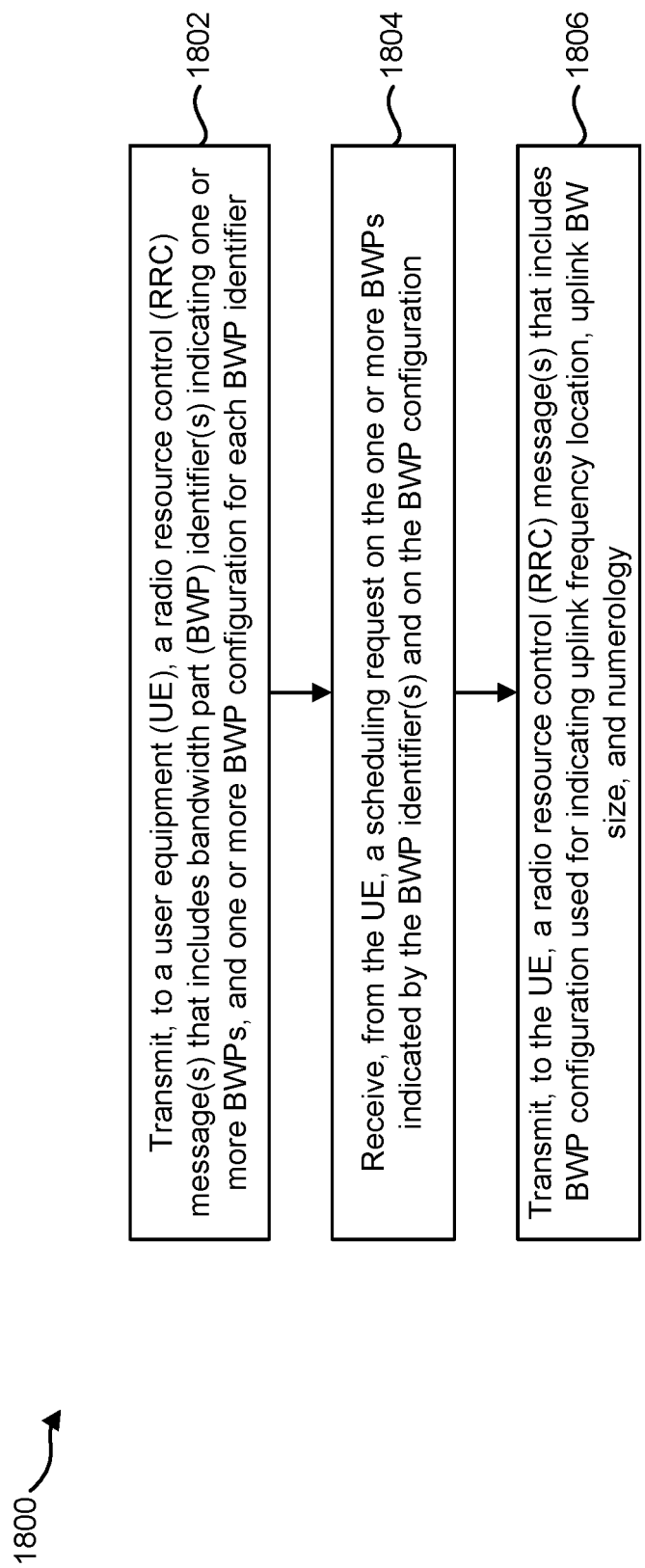
FIG. 18 is a flow diagram illustrating a communication method of a base station apparatus (gNB).

FIG. 18 is a flow diagram illustrating a communication method 1800 of a base station apparatus (gNB) 160. The gNB 160 may transmit 1802, to a user equipment (UE) 102, a radio resource control (RRC) message(s) that includes bandwidth part (BWP) identifier(s) indicating one or more BWPs, and one or more BWP configuration for each BWP identifier. The gNB 160 may receive 1804, from the UE 102, a scheduling request on the one or more BWPs indicated by the BWP identifier(s) and on the BWP configuration. The gNB 160 may transmit 1806, to the UE 102, a radio resource control (RRC) message(s) that includes BWP configuration used for indicating uplink frequency location, uplink BW size, and numerology.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment comprising:
   receiving circuitry configured to receive, from a base station apparatus, a radio resource control (RRC) message(s) comprising more than one scheduling request (SR) configuration, bandwidth part (BWP) identifier(s) indicating one or more BWPs, and one or more BWP configuration used for indicating uplink frequency location, uplink BW size, and numerology; and
   transmitting circuitry configured to transmit, to the base station apparatus, SR on a physical uplink control channel (PUCCH) based on the one or more BWPs indicated by the BWP identifier(s); wherein
   each SR configuration is associated with a set of PUCCH resources for SR across different bandwidths in frequency domain and is corresponding to the following:
   one or more logical channel groups (LCG),
   one or more priorities, and
   one or more subcarrier spacings.

2. A base station apparatus comprising:
   transmitting circuitry configured to transmit, to a user equipment, a radio resource control (RRC) message(s) comprising more than one scheduling request (SR) configurations and bandwidth part (BWP) identifier(s) indicating one or more BWPs, wherein the BWP configuration is used for indicating uplink frequency location, uplink BW size, and numerology; and
   receiving circuitry configured to receive, from the user equipment, SR on a physical uplink control channel (PUCCH) based on the one or more BWPs indicated by the BWP identifier(s); wherein
   each SR configuration is associated with a set of PUCCH resources for SR across different bandwidths in frequency domain and is corresponding to the following:
   one or more logical channel groups (LCG),
   one or more priorities, and
   one or more subcarrier spacings.

3. A method of a user equipment, the method comprising:
   receiving, from a base station apparatus, a radio resource control (RRC) message(s) comprising more than one scheduling request (SR) configurations and bandwidth part (BWP) identifier(s) indicating one or more BWPs, wherein the BWP configuration is used for indicating uplink frequency location, uplink BW size, and numerology; and
   transmitting, to the base station apparatus, SR on a physical uplink control channel (PUCCH) based on the one or more BWPs indicated by the BWP identifier(s); wherein
   each SR configuration is associated with a set of PUCCH resources for SR across different bandwidths in frequency domain and is corresponding the following:
   one or more logical channel groups (LCG),
   one or more priorities, and
   one or more subcarrier spacings.

4. A method of a base station apparatus, the method comprising:
- transmitting, to a user equipment, a radio resource control (RRC) message(s) comprising more than one scheduling request (SR) configurations and bandwidth part (BWP) identifier(s) indicating one or more BWPs, wherein the BWP configuration is used for indicating uplink frequency location, uplink BW size, and numerology; and
- receiving, from the user equipment, SR on a physical uplink control channel (PUCCH) based on the one or more BWPs indicated by the BWP identifier(s); wherein
- each SR configuration is associated with a set of PUCCH resources for SR across different bandwidths in frequency domain and is corresponding to the following:
  - one or more logical channel groups (LCG),
  - one or more priorities, and
  - one or more subcarrier spacings.

\* \* \* \* \*